(12) United States Patent
Keum et al.

(10) Patent No.: US 11,749,856 B2
(45) Date of Patent: Sep. 5, 2023

(54) BATTERY MODULE

(71) Applicant: Samsung SDI Co., Ltd., Yongin-si (KR)

(72) Inventors: Jaeyoung Keum, Yongin-si (KR); Daeyeop Park, Yongin-si (KR); Wunseok Jeong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 380 days.

(21) Appl. No.: 16/763,754

(22) PCT Filed: Oct. 1, 2018

(86) PCT No.: PCT/KR2018/011656
§ 371 (c)(1),
(2) Date: May 13, 2020

(87) PCT Pub. No.: WO2019/117437
PCT Pub. Date: Jun. 20, 2019

(65) Prior Publication Data
US 2020/0373637 A1    Nov. 26, 2020

(30) Foreign Application Priority Data

Dec. 11, 2017 (KR) ........................ 10-2017-0169524

(51) Int. Cl.
*H01M 10/6556* (2014.01)
*H01M 10/6568* (2014.01)
*H01M 10/613* (2014.01)

(52) U.S. Cl.
CPC ..... *H01M 10/6556* (2015.04); *H01M 10/613* (2015.04); *H01M 10/6568* (2015.04)

(58) Field of Classification Search
CPC .......... H01M 10/6556; H01M 10/613; H01M 10/6568; H01M 50/20; H01M 10/625;
(Continued)

(56) References Cited

U.S. PATENT DOCUMENTS 8,846,233 B2   9/2014 Lee et al.
8,911,896 B2   12/2014 Jin
(Continued)

FOREIGN PATENT DOCUMENTS

CN   102171884 A      8/2011
CN   102347509 A  *  2/2012   .......... H01M 10/613
(Continued)

OTHER PUBLICATIONS

EPO Extended European Search Report dated Jul. 12, 2021, issued in corresponding European Patent Application Mo. 18888354.0 (8 pages).

(Continued)

*Primary Examiner* — Kaity V Chandler
(74) *Attorney, Agent, or Firm* — Lewis Roca Rothgerber Christie LLP

(57) ABSTRACT

The present disclosure discloses a battery module. The battery module may include: a battery pack; a tube element accommodating a flow of a cooling medium for cooling the battery pack; and a tube element cover surrounding the tube element in a section in which a path of the tube element is bent or the tube element is discontinuously connected.

According to the present disclosure, the battery module includes the tube element cover which covers a fragile section such as a bent section or discontinuously connected section of the tube element in which the cooling medium flows such that the tube element may be protected from the pressure of a molten metal cast at a high pressure during a high-pressure die casting process.

23 Claims, 20 Drawing Sheets

(58) Field of Classification Search
CPC ............ H01M 50/249; H01M 50/204; H01M 50/224; H01M 2220/10; H01M 2220/20; Y02E 60/10
See application file for complete search history.

(56) References Cited

U.S. PATENT DOCUMENTS

| | | |
|---|---|---|
| 9,046,198 B2 | 6/2015 | Mongiorgi et al. |
| 10,424,820 B2 | 9/2019 | Kim |
| 2013/0056591 A1 | 3/2013 | Mongiorgi et al. |
| 2016/0036102 A1 | 2/2016 | Suzuki et al. |
| 2016/0079640 A1 | 3/2016 | Kim |
| 2016/0131285 A1 | 5/2016 | Komiya et al. |
| 2017/0346146 A1 | 11/2017 | Kim |

FOREIGN PATENT DOCUMENTS

| | | | | |
|---|---|---|---|---|
| CN | 202937933 U | 5/2013 | | |
| CN | 107453003 A | 12/2017 | | |
| DE | 10-2010-013025 A1 | 9/2011 | | |
| EP | 2337143 A2 | 6/2011 | | |
| EP | 3249738 A2 | 11/2017 | | |
| JP | 11-307139 A | 11/1999 | | |
| JP | 2013-246990 A | 12/2013 | | |
| JP | 5899132 B2 | 3/2016 | | |
| KR | 10-1261736 B1 | 5/2013 | | |
| KR | 10-2014-0037305 A | 3/2014 | | |
| KR | 10-2015-0074384 A | 7/2015 | | |
| KR | 10-2016-0030724 A | 3/2016 | | |
| KR | 10-2016-0056794 A | 5/2016 | | |
| KR | 10-1674068 B1 | 11/2016 | | |
| KR | 10-1735069 B1 | 5/2017 | | |
| KR | 10-1761678 B1 | 7/2017 | | |
| KR | 10-2017-0133178 A | 12/2017 | | |
| KR | 20180042018 A | * | 4/2018 | ........ H01M 10/6556 |
| TW | M272009 U | 8/2005 | | |
| WO | WO 2014-077578 A1 | 5/2014 | | |
| WO | WO 2014/155609 A1 | 10/2014 | | |
| WO | WO-2014155609 A1 | * | 10/2014 | .......... H01M 10/613 |
| WO | WO-2018070674 A1 | * | 4/2018 | .......... H01M 10/613 |
| WO | WO-2018070675 A1 | * | 4/2018 | .......... H01M 10/613 |
| WO | WO-2018074686 A1 | * | 4/2018 | .......... H01M 10/613 |

OTHER PUBLICATIONS

Korean Registration Determination Certificate dated Oct. 27, 2020, issued in corresponding Korean Patent Application No. 10-2017-0169524 (6 pages).
Chinese Office action issued in corresponding application No. CN 201880074718.1, dated Dec. 12, 2022, 9 pages.
Chinese Office action issued in corresponding application No. CN 201880074718.1, dated May 22, 2023, with English Translation, 18 pages.

* cited by examiner

BATTERY MODULE

CROSS-REFERENCE TO RELATED APPLICATION(S)

This application is a National Phase Patent Application of International Patent Application Number PCT/KR2018/011656, filed on Oct. 1, 2018, which claims priority of Korean Patent Application No. 10-2017-0169524, filed Dec. 11, 2017. The entire contents of both of which are incorporated herein by reference.

TECHNICAL FIELD

The present disclosure relates to a battery module.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid vehicles, electric bicycles, or uninterruptible power supplies. Secondary batteries are individually used or secondary battery modules each including a plurality of secondary batteries connected as one unit are used according to the types of external devices using secondary batteries.

Unlike small mobile devices such as cellular phones each operable for a certain period of time using a single battery, devices such as electric vehicles or hybrid vehicles having long operation times and consuming large amounts of electricity may prefer battery modules each including a plurality of batteries to handle problems relating to power and capacity, and the output voltages or currents of battery modules may be increased by adjusting the number of batteries included in each battery module.

DESCRIPTION OF EMBODIMENTS

Technical Problem

According to an embodiment of the present disclosure, a battery module includes a tube element cover which covers a fragile section such as a bent section or discontinuously connected section of a tube element in which a cooling medium flows such that the tube element may be protected from the pressure of a molten metal which is cast at a high pressure during a high-pressure die casting process.

Solution to Problem

A battery module of the present disclosure includes;
a battery pack;
a tube element accommodating a flow of a cooling medium for cooling the battery pack; and
a tube element cover surrounding the tube element in a section in which a path of the tube element is bent or the tube element is discontinuously connected.

Advantageous Effects of Disclosure

According to an embodiment of the present disclosure, a battery module includes a tube element cover which covers a fragile section such as a bent section or discontinuously connected section of a tube element in which a cooling medium flows such that the tube element may be protected from the pressure of a molten metal which is cast at a high pressure in a high-pressure die casting process.

As described above, since damage to the tube element in which a cooling medium flows is prevented, the flow resistance of the cooling medium may be maintained at a low level, and the efficiency of cooling may be improved while reducing power consumption for cooling.

BEST MODE

Figure 1:
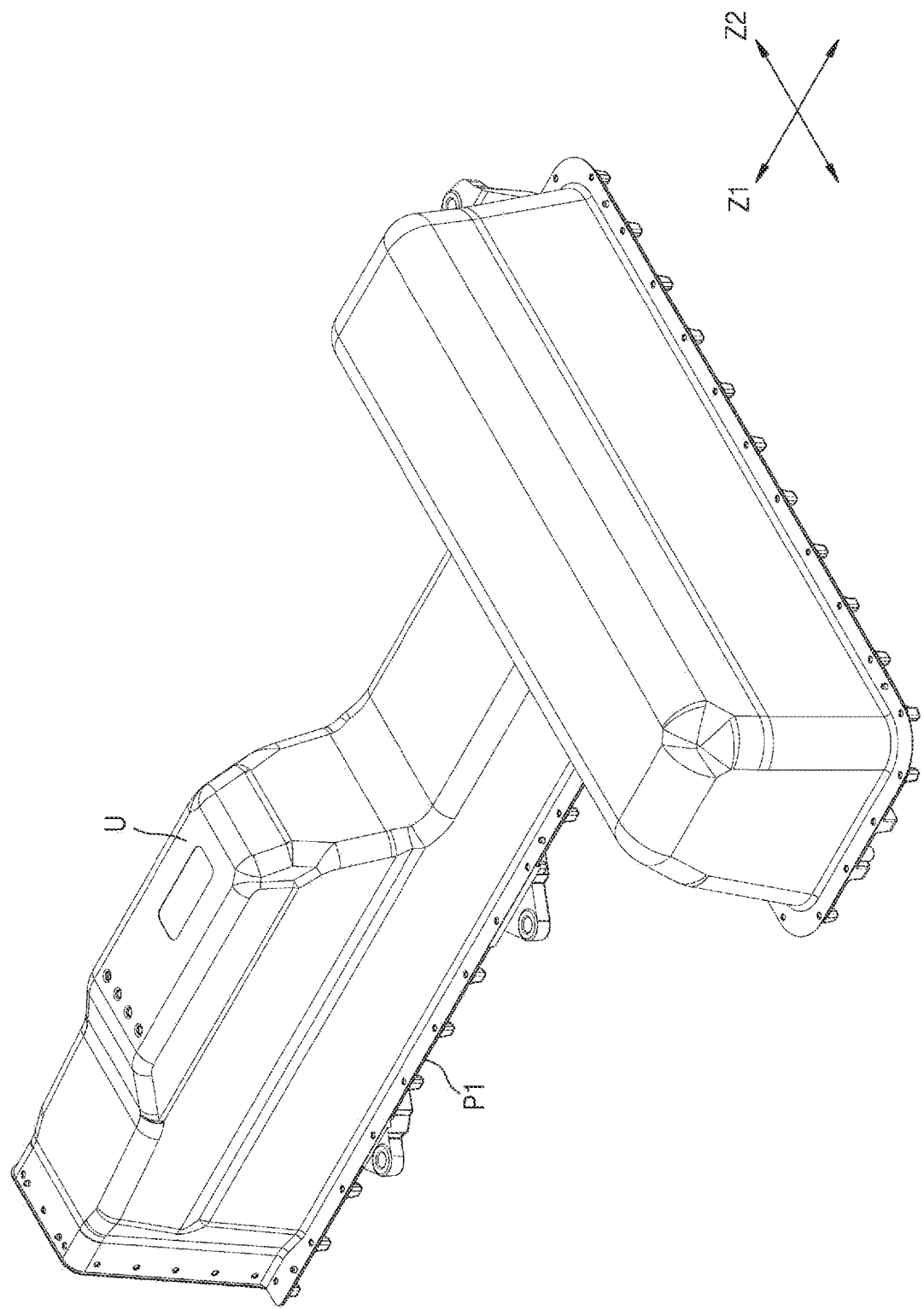
FIG. 1 illustrates a battery module according to an embodiment of the present disclosure.

A battery module of the present disclosure includes:
a battery pack;
a tube element accommodating a flow of a cooling medium for cooling the battery pack; and
a tube element cover surrounding the tube element in a section in which a path of the tube element is bent or the tube element is discontinuously connected.

For example, the section in which the tube element is discontinuously connected may include a section in which a flow of the cooling medium is split or flows of the cooling medium is joined together.

For example, the tube element cover may be formed on an outer side of the tube element connected to a connection tank for forming a branch point or confluence point of the cooling medium.

For example, the battery module may include:

a first cooling tube formed at a first level on a bottom of the battery module to cool a first group of battery packs;

a second cooling tube formed at a second level higher than the first level to cool a second group of battery packs;

a third cooling tube formed at a third level higher than the first level to cool a third group of battery packs;

a front connector connecting the first and second cooling tubes to each other; and a rear connector connecting the first and third cooling tubes to each other, wherein the tube element cover may be formed on at least one of tube elements which form the first to third cooling tubes, the front connector, and the rear connector.

For example, the tube element cover may include:

a first tube element cover formed on the front connector; and a second tube element cover formed on the rear connector.

For example, the first tube element cover may be formed on an outer side of a tube element connected to one of first and second connection tanks of the front connector which may be formed at the first and second levels.

For example, the first tube element cover may extend in one direction in parallel with a tube element from a connection position of the tube element at which the tube element is connected to the first connection tank.

For example, the second tube element cover may be formed on an outer side of a tube element connected to one of third and fourth connection tanks of the rear connector which are formed at the first and third levels.

For example, the second tube element cover may extend in a bent direction in parallel with a tube element connected to the third connection tank.

For example, the second tube element cover may have an extension length of 5 mm or more along a straight portion of the tube element, the straight portion extending in one direction from an end point at which a bent portion of the tube element ends.

For example, the first cooling tube may include a longitudinal portion extending in parallel with the second cooling tube and a transverse portion extending in parallel with the third cooling tube, and the tube element cover may include third tube element covers formed on both sides of the transverse portion.

For example, the third tube element covers may be formed to cover a tube element of the first cooling tube which is bent to turn back the flow of the cooling medium in a length direction of the transverse portion.

For example, the third tube element covers may be used to cover an inner tube element arranged in a relatively inner region in a bent direction of the first cooling tube and an outer tube element arranged in a relatively outer region in the bent direction of the first cooling tube.

For example, each of the third tube element covers may include an inner portion and an outer portion which respectively cover the inner tube element and the outer tube element, and each of the inner portion and the outer portion may have an extension length of 5 mm or more in the length direction of the transverse portion from an end point at which a bent portion of the inner tube element or the outer tube element ends.

For example, each of the third tube element covers may include an inner portion and an outer portion which respectively cover the inner tube element and the outer tube element, and the inner portion may extend more than the outer portion in the length direction of the longitudinal portion.

For example, the tube element cover may include:

a fourth tube element cover fitted around the bent portion of the inner tube element; and a pair of fifth tube element covers fitted around different bent portions of the outer tube element and spaced apart from each other, wherein the third tube element covers may be used to cover all the fourth and fifth tube element covers.

For example, each of the third tube element covers may include first and second cover members which are coupled to each other in mutually-facing directions with a tube element of the first cooling tube being therebetween.

For example, the first and second cover members may be fitted to each other to form a stepped interface between the first and second cover members.

For example, the battery module may further include a binder provided in a straight section in which the path of the tube element extends in a direction and including a jig groove so as to be coupled to outer sides of the tube element and another tube element extending in parallel with the tube element and fix positions of the tube elements, wherein the binder and the tube element cover may be arranged at a distance from each other.

For example, the binder and the tube element cover may have a clearance in the direction within a range of 5 mm or more.

For example, the tube element and tube element cover may be embedded in a lower housing, and the lower housing may be coupled to an upper housing in mutually-facing directions in a state in which an accommodation space in which the battery pack is accommodated is defined between the lower housing and the upper housing.

For example, the tube element cover may be not exposed at a top surface and a bottom surface of the lower housing.

For example, the top surface of the lower housing may define the accommodation space in which the battery pack is accommodated, and may provide a support surface for the battery pack, and the bottom surface of the lower housing may provide a support surface of the battery module.

For example, the tube element cover and the lower housing may be formed of a same metallic material.

MODE OF DISCLOSURE

Hereinafter, a battery module will be described according to preferred embodiments of the present disclosure with reference to the accompanying drawings.

FIG. 1 illustrates a battery module according to an embodiment of the present disclosure.

Figure 2:
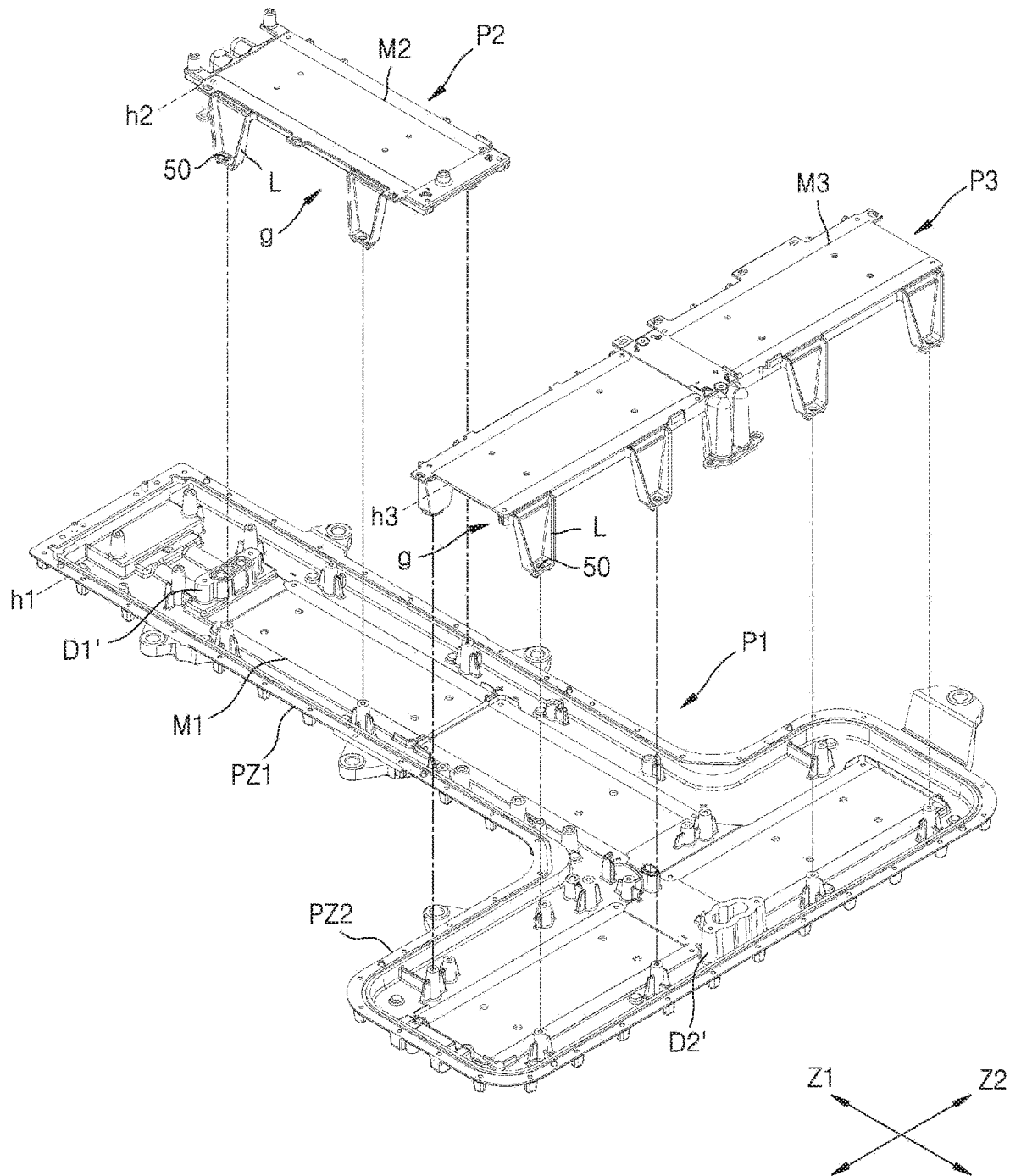
FIG. 2 is an exploded perspective view illustrating an internal structure of the battery module shown in FIG. 1.
Figure 3:
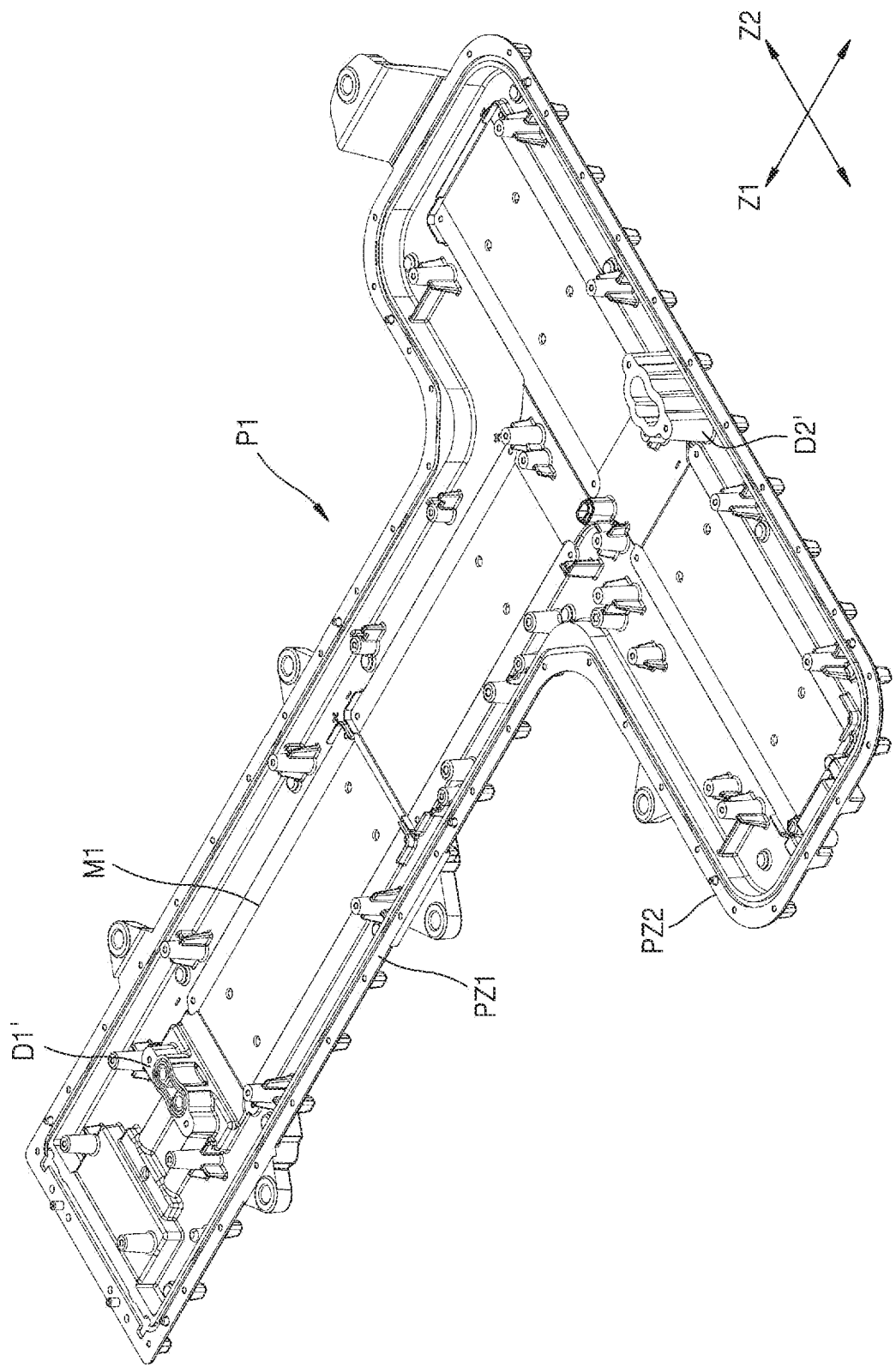
FIGS. 3 to 5 are perspective views illustrating a lower housing and front and rear cooling plates which are shown in FIG. 2.
Figure 4:
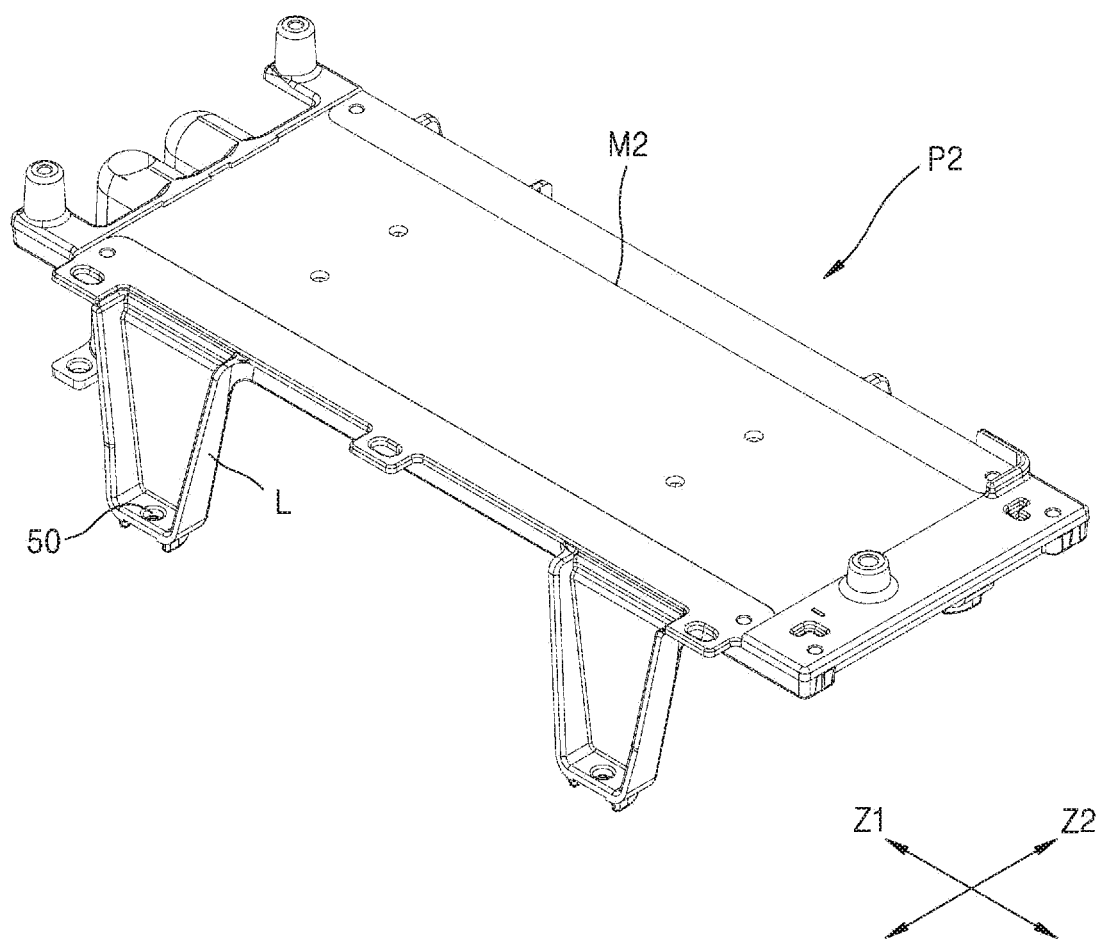
Figure 5:
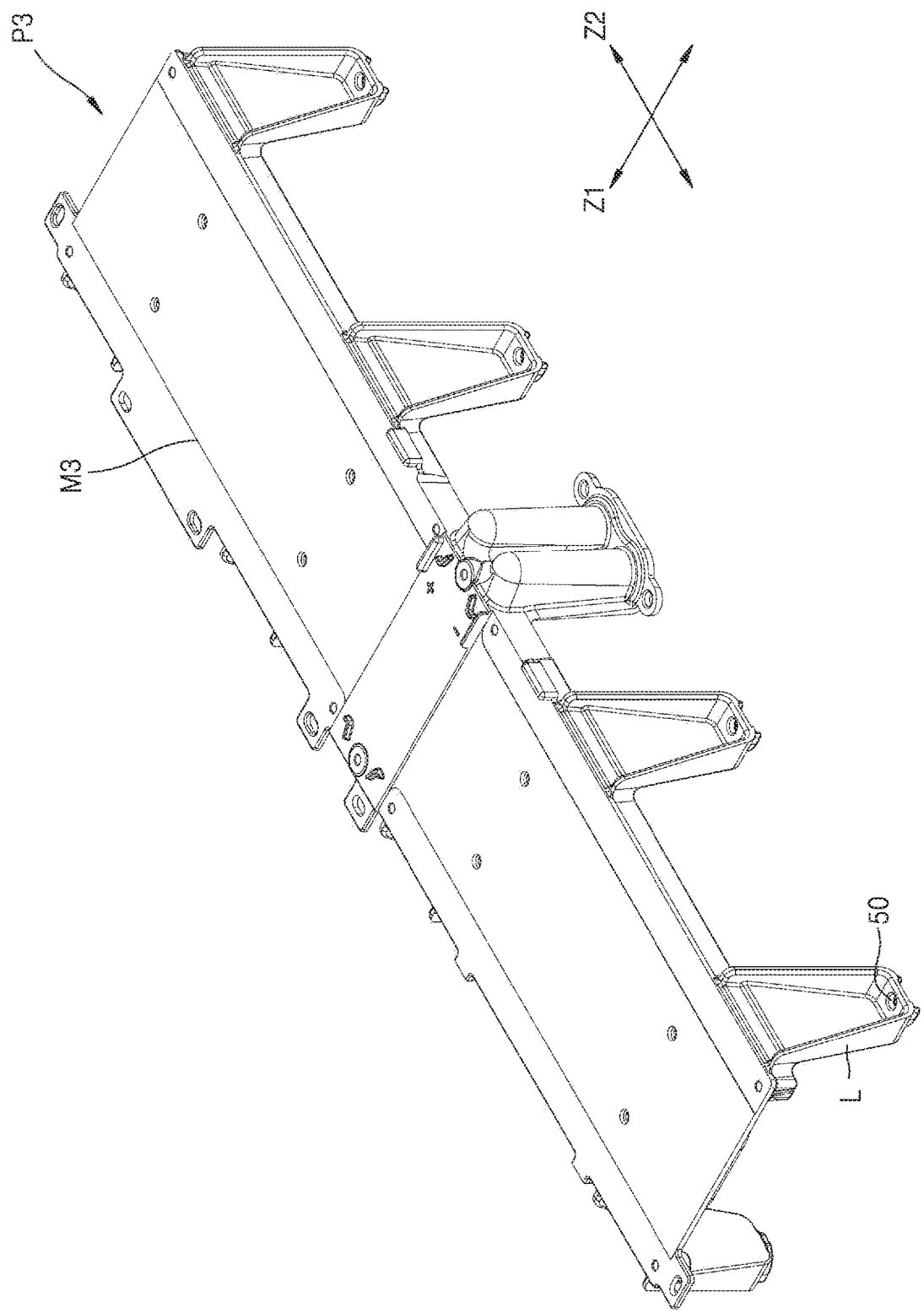

Referring to the drawing, the battery module may include: a lower housing P1 placed on a bottom of the battery module; a plurality of battery packs arranged above the lower housing P1; and an upper housing U coupled to the lower housing P1 and facing the lower housing P1 to form an accommodation space for the battery packs and protect the battery packs from external environments. The lower housing P1 and the upper housing U may have the same shape, such as a T-shape extending in first and second directions Z1 and Z2 different from each other, such that the lower housing P1 and the upper housing U may be coupled to each other in mutually-facing directions, FIG. 2 is an exploded perspective view illustrating an internal structure of the battery module shown in FIG. 1, In addition, FIGS. 3 to 5 are perspective views illustrating the lower housing and front and rear cooling plates which are shown in FIG. 2.

Referring to the drawings, a front cooling plate P2 may be spaced upward from the lower housing P1 with a battery pack accommodation space (g) therebetween, and a rear cooling plate P3 may be spaced upward from the lower housing P1 with the battery pack accommodation space (g) therebetween.

The lower housing P1 and the front and rear cooling plates P2 and P3, which are respectively in direct contact with battery packs M1, M2, and M3 to dissipate heat from the battery packs M1, M2, and M3, may have a function of supporting the battery packs M1, M2, and M3 and a function of dissipating heat from the battery packs M1 M2, and M3. For example, the lower housing P1 may be placed at a first level h1 corresponding to the bottom of the battery module to support a first group of battery packs M1 and dissipate heat from the first group of battery packs M1. In addition, the front cooling plate P2 may be placed at a second level h2 higher than the first level h1 to support a second group of battery packs M2 and dissipate heat from the second group of battery packs M2. In addition, the rear cooling plate P3 may be placed at a third level h3 higher than the first level h1 to support a third group of battery packs M3 and dissipate heat from the third group of battery packs M3, In the drawings attached to the present disclosure, installation places of the first, second, and third groups of battery packs M1, M2, and M3 are indicated instead of illustrating the first, second, and third groups of battery packs M1, M2, and M3 for ease of understanding.

The first to third groups of battery packs M1, M2, and M3 may each include at least one battery pack and may include different numbers of battery packs. In an embodiment of the present disclosure, the first group of battery packs M1 placed at the first level h1 corresponding to the bottom of the battery module may include the largest number of battery packs, and the second group of battery packs M2 may include the fewest battery packs. In addition, the number of battery packs of the third group of battery packs M3 may less than the number of battery packs of the first group of battery packs M1 but may be greater than the number of battery packs of the second group of battery packs M2.

In an embodiment of the present disclosure, the first group of battery packs M1 arranged on the lower housing P1 may include four battery packs. As described later, the lower housing P1 may include a longitudinal portion PZ1 extending in the first direction Z1 and a transverse portion PZ2 extending in the second direction Z2, wherein two battery packs may be arranged on the longitudinal portion PZ1 in the first direction Z1, and two battery packs may be arranged on the transverse portion PZ2 in the second direction Z2. In addition, the second group of battery packs M2 arranged on the second cooling plate P2 may include one battery pack. The front cooling plate P2 may extend in the first direction Z1, and one battery pack may be placed on the front cooling plate P2 in the first direction Z1. In addition, the third group of battery packs M3 arranged on the rear cooling plate P3 may include two battery packs. The rear cooling plate P3 may extend in the second direction Z2, and two battery packs may be arranged on the rear cooling plate P3 in the second direction Z2.

As described later, in the present disclosure, first to third cooling tubes C1 C2, and C3 (refer to FIG. 6) for dissipating heat from the first to third groups of battery packs M1, M2, and M3 may be adjusted in diameter, number, interval, or the like, so as to guarantee uniform heat-dissipation performance for the battery packs M1, M2, and M3.

When heat is relatively poorly dissipated from some of the battery packs M1, M2, and M3 of the battery module, the performance and lifespan of the battery packs may decrease, and thus the overall performance and lifespan of the battery module may also decrease. To prevent this, it is preferable that uniform heat-dissipation performance be guaranteed for the battery packs M1, M2, and M3.

The lower housing P1 includes: the longitudinal portion PZ1 extending in the first direction Z1; and the transverse portion PZ2 extending in the second direction Z2 different from the first direction Z1. For example, the longitudinal portion PZ1 and the transverse portion PZ2 may extend in the first and second directions Z1 and Z2 perpendicular to each other. Therefore, the lower housing P1 may have a T-shape as a whole.

The front cooling plate P2 may be spaced upward from the longitudinal portion PZ1 of the lower housing P1 with the battery pack accommodation space (g) therebetween. In this case, the longitudinal portion PZ1 of the lower housing P1 may be parallel with the front cooling plate P2 in the first direction Z1. The rear cooling plate P3 may be spaced upward from the transverse portion PZ2 of the lower housing P1 with the battery pack accommodation space (g) therebetween. In this case, the longitudinal portion PZ1 of the lower housing P1 and the front cooling plate P2 may be parallel with each other in the first direction Z1. In this case, the front cooling plate P2 and the rear cooling plate P3 may be apart from each other.

The lower housing P1 may form the bottom of the battery module and may provide a base for the battery module. That is, the front and rear cooling plates P2 and P3 may be supported together on the lower housing P1. To this end, legs L may be formed on the front and rear cooling plates P2 and P3 to support the front and rear cooling plates P2 and P3 above the lower housing P1. That is, the legs L may be formed between the lower housing P1 and the front cooling plate P2 and between the lower housing P1 and the rear cooling plate P3 to support the front and rear cooling plates P2 and P3 with the battery pack accommodation space (g) between the lower housing P1 and the front and rear cooling plates P2 and P3. Coupling holes 50 are formed in the legs L protruding from the front and rear cooling plates P2 and P3 such that the positions of the front and rear cooling plates P1 and P3 may be fixed by coupling fastening members (not shown) to the lower housing P1 through the coupling holes 50.

The lower housing P1 to which the front and rear cooling plates P1 and P3 are fixed may be covered with the upper housing U (refer to FIG. 1). The upper housing U may seal the first to third groups of battery packs M1 M2, and M3 arranged on the lower housing P1 and the front and rear cooling plates P2 and P3 to protect the first to third groups of battery packs M1, M2, and M3 from external environments. That is, the lower housing P1 and the upper housing U may be coupled to each other in mutually-facing directions to form the accommodation space (g) in which the first to third groups of battery packs M1, M2, and M3 are accommodated. The lower housing P1 and the upper housing U may have the same shape such as a T-shape such that the lower housing P1 and the upper housing U may be coupled to each other in mutually-facing directions.

Figure 6:
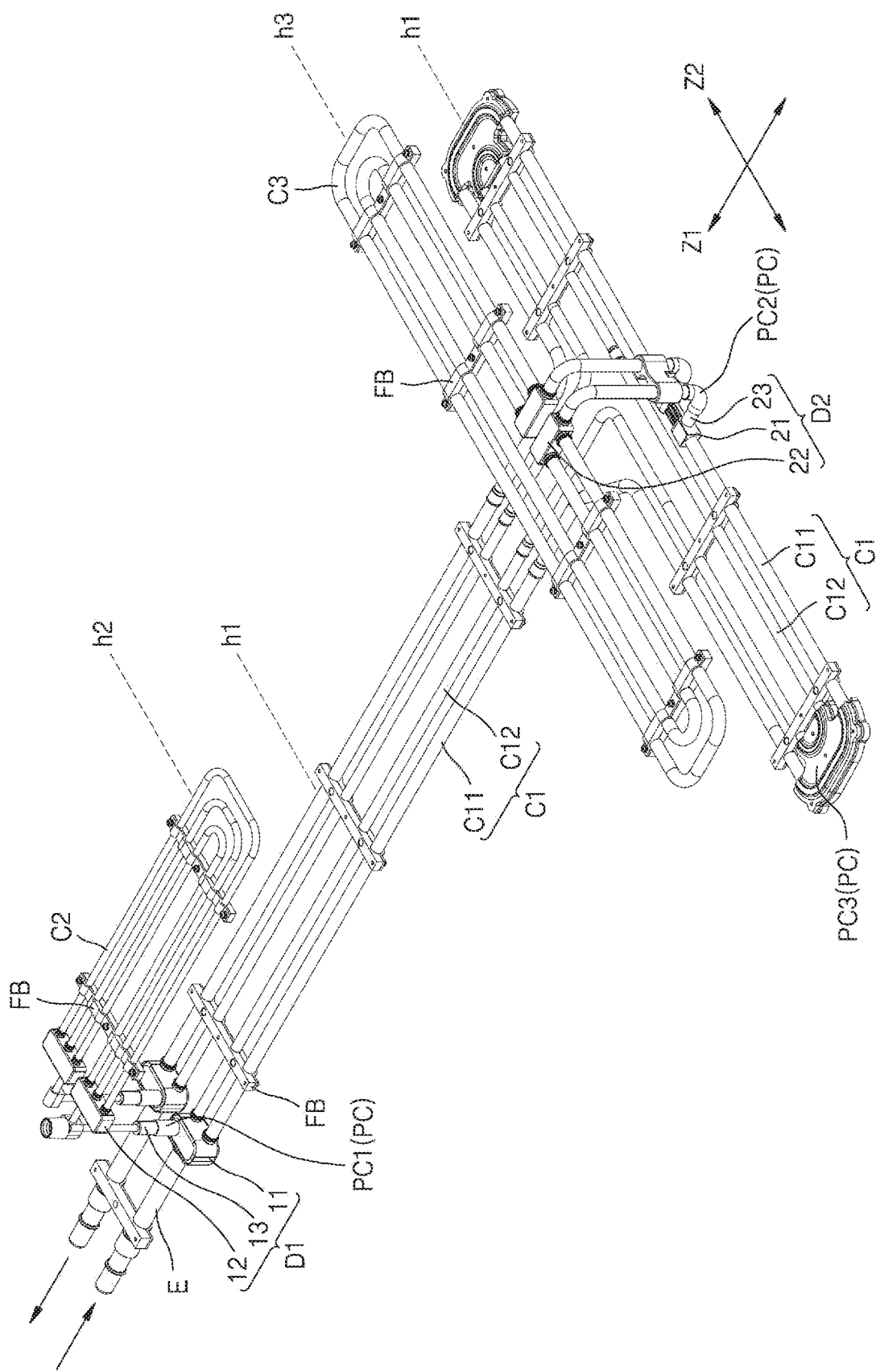
FIG. 6 is a view illustrating structures of first to third cooling tubes to be embedded in the lower housing and the front and rear cooling plates.

FIG. 6 illustrates structures of the first to third cooling tubes C1 C2, and C3 embedded in the lower housing P1 and the front and rear cooling plates P2 and P3.

Referring to the drawing, the lower housing P1 and the front and rear cooling plates P2 and P3 may support the battery packs M1 M2, and M3, and may be in thermal contact with the battery packs M1, M2, and M3, for example, in direct contact with the battery packs M1 M2, and M3, to dissipate heat from the battery packs M1, M2, and M3. In addition, to this end, the first to third cooling tubes C1, C2, and C3 may be respectively embedded in the lower housing P1 and the front and rear cooling plates P2 and P3. Here, the first to third cooling tubes C1 C2, and C3 may be respectively embedded in the lower housing P1 and the front and rear cooling plates P2 and P3 as integral parts of the lower housing P1 and the front and rear cooling plates P2 and P3.

The first to third cooling tubes C1, C2, and C3 may be formed of a metallic material different from a metallic material used to form the lower housing P1 and the front and rear cooling plates P1 and P3, and may be formed by die casting. For example, the lower housing P1 and the front and rear cooling plates P1 and P3 may be formed by casting a molten metal into a die (not shown) in which the first to third cooling tubes C1, C2, and C3 are fixed. In this manner, the lower housing P1 and the front and rear cooling plates P1 and P3 in which the first to third cooling tubes C1, C2 and C3 are integrally embedded may be obtained. For example, the first to third cooling tubes C1, C2 and C3, and the lower housing P1 and the front and rear cooling plates P1 and P3 may be formed of different metallic materials. In this case, the first to third cooling tubes C1, C2, and C3 may be formed of SUS having a relatively high melting point, and the lower housing P1 and the front and rear cooling plates P1 and P3 may be formed of an aluminum material having a relatively low melting point. For example, in a state in which the first to third cooling tubes C1, C2, and C3 formed of SUS are fixed to the inside of a die (not shown), molten aluminum may be cast into the die, and at this time, the first to third cooling tubes C1, C2, and C3 may remain in a solid state and maintain shapes thereof owing to the melting point difference. The first to third cooling tubes C1, C2, and C3, and the lower housing P1 and the front and rear cooling plates P2 and P3 may be formed of SUS and an aluminum material that have high thermal conductivity and different melting points to smoothly dissipate heat from the battery packs M1, M2, and M3 while making thermal contact with the battery packs M1, M2, and M3.

As described above, the first cooling tube C1 is embedded in the lower housing P1, and the second cooling tube C2 is embedded in the front cooling plate P2. In addition, the third cooling tube C3 may be embedded in the rear cooling plate P3. Therefore, the first cooling tube C1 may be arranged at the same level as the lower housing P1, that is, at the first level h1 corresponding to the bottom of the battery module, and the second cooling tube C2 may be arranged at the same level as the front cooling plate P2, that is, at the second level h2 higher than the bottom level of the battery module. In addition, the third cooling tube C3 may be arranged at the same level as the rear cooling plate P3, that is, at the third level h3 higher than the bottom level of the battery module. In this case, the second level h2 of the second cooling tube C2 may be equal to the third level h3 of the third cooling tube C3.

The first cooling tube C1 and the second cooling tube C2 may be connected to each other through a front connector D1. More specifically, external connection tubes E may be connected to the front connector D1 together with the first and second cooling tubes C1 and C2. A cooling medium introduced through the external connection tubes E may be distributed to the first and second cooling tubes C1 and C2 through the front connector D1, and the cooling medium flowing in the first and second cooling tubes C1 and C2 may be collected at the front connector D1 and discharged to the external connection tubes E. The cooling medium may flow as follows. The cooling medium having a low temperature and introduced through the external connection tubes E and the front connector D1 may be distributed to the first and second cooling tubes C1 and C2 for exchanging heat with the first and second groups of battery packs M1 and M2, and the cooling medium heated to a high temperature through the heat exchange may be collected at the front connector D1 and may be discharged through the external connection tubes E connected to the front connector D1.

As described later, the cooling medium flowing in the first cooling tube C1 may be distributed to the third cooling tube C3 through a rear connector D2. That is, a portion of the cooling medium introduced into the first cooling tube C1 through the front connector D1 may cool the first group of battery packs M1 and may flow back to the front connector D1 through a bypass flow path, for example, an inner tube element C12, and the other portion of the cooling medium introduced into the first cooling tube C1 may flow to the third cooling tube C3 through the rear connector D2.

The front connector D1 may be located at a front position of the battery module, and the rear connector D2 may be located at a rear position of the battery module. Reference numerals D1 in FIG. 2 and D1 in FIG. 6 are both for the front connector. However, since FIG. 2 illustrates only a portion (lower portion) of the front connector, the front connector is indicated with a different reference numeral in FIG. 2. Similarly, reference numerals D2' in FIG. 2 and D2 in FIG. 6 are both for the rear connector. However, since FIG. 2 illustrates only a portion (lower portion) of the rear connector, the rear connector is indicated with a different reference numeral in FIG. 2.

The first cooling tube C1 and the third cooling tube C3 may be connected to each other through the rear connector D2. The cooling medium may flow from the first cooling tube C1 to the third cooling tube C3 through the rear connector D2, and after cooling the third group of battery packs M3, the cooling medium may return to the first cooling tube C1 through the rear connector D2. For example, a portion of the cooling medium flowing in the first cooling tube C1 may cool only the first group of battery packs M1 and may then bypass the rear connector D2 through the inner tube element C12, and the other portion of the cooling medium flowing in the first cooling tube C1 may cool the first group of battery packs M1 and then the third group of battery packs M3 through the rear connector D2. As described above, the flow path of the first cooling tube C1 may include, as parallel flow paths, the inner tube element C12 which is a bypass flow path and an outer tube element C11 which is a flow path including the rear connector D2. In this case, the inner tube element C12 which is a bypass flow path and the outer tube element C11 which is a flow path including the rear connector D2 may be separate from each other by the front connector D1 forming a start point and an end point of the circulation path of the first cooling tube C1.

Since the inner tube element C12 is formed as a bypass flow path in the flow path of the first cooling tube C1, heat may be efficiently dissipated from the first group of battery packs M1 having the greatest number of battery packs. For example, the cooling medium flowing through the inner tube element C12 may have a somewhat low temperature and may thus efficiently cool the first group of battery packs M1 on the way back to the front connector D1.

The first to third cooling tubes C1, C2, and C3 may be formed of one or more tube elements. For example, the first to third cooling tubes C1, C2, and C3 may be formed of a plurality of tube elements extending side by side to form flow paths of the cooling medium, and at least two or more tube elements extending side by side may form each of the first to third cooling tubes C1, C2, and C3. For example, the first cooling tube C1 may include the inner tube element C12 formed in a relatively inner region along the path of the cooling medium and the outer tube element C11 formed in a relatively outer region along the path of the cooling medium. In the present disclosure, tube elements are for accommodating flows of the cooling medium and forming flow paths of the cooling medium, and a tube element may collectively refer to one or all of tube elements forming the first to third cooling tubes C1, C2 and C3 and the front and rear connectors D1 and D2 connecting the first to third cooling tubes C1, C2 and C3. That is, in the present disclosure, a tube element or tube elements may be understood as a broad concept encompassing all the flow paths of the cooling medium embedded in the lower housing P1 and the front and rear cooling plates P2 and P3. The term "tube element" may collectively refer to the first to third cooling tubes C1, C2, and C3 for directly cooling the first to third groups of battery packs M1, M2, and M3, and one or all of the tube elements forming the front and rear connectors D1 and D2 which connect the first to third cooling tubes C1, C2 and C3 to each other.

The first to third groups of battery packs M1, M2, and M3 are distributed onto the lower housing P1 and the front and rear cooling plates P2 and P3 which are arranged at different positions. The first to third cooling tubes C1, C2, and C3 may have different diameters to uniformly dissipate heat from the first to third groups of battery packs M1, M2, and M3 which are distributed at a plurality of positions as described above. Here, when each of the first to third cooling tubes C1, C2 and C3 is formed of a plurality of tube elements extending side by side, the diameters of the first to third cooling tubes C1, C2, and C3 may refer to the diameters of the tube elements forming the first to third cooling tubes C1, C2 and C3.

Since the first cooling tube C1 is used to dissipate heat from the first group of battery packs M1 having the greatest number of battery packs, the first cooling tube C1 may have the largest diameter. For example, the first cooling tube C1 may have a diameter of 11 mm. The second cooling tube C2 are used to dissipate heat from the second group of battery packs M2 having the smallest number of battery packs and are close to the external connection tubes E having a relatively high pressure. Therefore, the second cooling tube C2 may have the smallest diameter to limit the flow rate of the cooling medium in the second cooling tube C2.

More specifically, the flow path of the first cooling tube C1 may include a flow path which passes through the rear connector D2, for example, the outer tube element C11, and a bypass flow path which bypasses the rear connector D2, for example, the inner tube element C12. In this case, the longest flow path connected to the third cooling tube C3 through the rear connector D2, that is, the longest flow path connected from the first cooling tube C1 to the third cooling tube C3, for example, the outer tube element C11 may have the largest diameter, for example, a diameter of 11 mm to guarantee a relatively high flow rate. In addition, a bypass flow path, which bypasses the rear connector D2 along the flow path of the first cooling tube C1, for example, the inner tube element C12, may have a relatively small diameter, for example, a diameter of 9 mm to limit the flow rate of the cooling medium in the inner tube element C12 compared with the outer tube element C11 which passes through the rear connector D2. That is, the inner tube element C12 of the first cooling tube C1, which is a bypass flow path, may be designed to have a smaller diameter than the outer tube element C11 which is a flow path including the rear connector D2, to allocate a relatively high flow rate to the outer tube element C11 which is a flow path including the rear connector D2 connected from the first cooling tube C1 to the third cooling tube C3 and requiring more cooling capacity. In particular, since the flow path of the first cooling tube C1 connected to the third cooling tube C3 farthest from the external connection tubes E is designed to have a relatively large diameter, that is, the outer tube element C11 is designed to have a relatively large diameter, the cooling medium flowing in the outer tube element C11 may have a low flow resistance and pressure drop, and thus the flow rate of the cooling medium in the outer tube element C11 may be properly maintained.

The second cooling tube C2 is used to dissipate heat from the second group of battery packs M2 having the smallest number of battery packs and is close to the external connection tubes E having a relatively high pressure. Therefore, the second cooling tube C2 may have the smallest diameter to limit the flow rate of the cooling medium in the second cooling tube C2. For example, the second cooling tube C2 may have a diameter of 6 mm.

Referring to FIG. 6, the front connector D1 may include first connection tanks 11 provided at the first level h1 and second connection tanks 12 provided at the second level h2, and first connection tubes 13 which connect the first and second connection tanks 11 and 12 to each other. In this case, the first and second connection tanks 11 and 12 may be embedded in the lower housing P1 and the front cooling plate P2, respectively. That is, the first connection tanks 11 may be embedded in the lower housing P1 together with the first cooling tube C1 and the second connection tanks 12 may be embedded in the front cooling plate P2 together with the second cooling tube C2. In this case, the first and second connection tanks 11 and 12 are embedded in the lower housing P1 and the front cooling plate P2 and are completely surrounded by the lower housing P1 and the front cooling plate P2, thereby preventing leakage through the first and second connection tanks 11 and 12 and permeation of leakage into the battery packs M1, M2 and M3.

The rear connector D2 may include a third connection tank 21 provided at the first level h1, fourth connection tanks 22 provided at the third level h3, and second connection tubes 23 which connect the third and fourth connection tanks 21 and 22 to each other. In this case, the third and fourth connection tanks 21 and 22 may be embedded in the lower housing P1 and the rear cooling plate P3, respectively. That is, the third connection tank 21 may be embedded in the lower housing P1 together with the first cooling tube C1, and the fourth connection tanks 22 may be embedded in the rear cooling plate P3 together with the third cooling tube C3. In this case, the third and fourth connection tanks 21 and 22 are embedded in the lower housing P1 and the rear cooling plate P3 and are completely surrounded by the lower housing P1 and the rear cooling plate P3, thereby preventing leakage through the third and fourth connection tanks 21 and 22 and permeation of leakage into the battery packs M1, M2 and M3.

In an embodiment of the present disclosure, each of the first connection tubes 13 provided between the first and second connection tanks 11 and 12 may be embedded in the lower housing P1 and the front cooling plate P2 in a distributed manner. For example, the first connection tubes 13 may include tube elements connected to the first connection tanks 11 and tube elements connected to the second connection tanks 12, wherein the tube elements of the first connection tubes 13 connected to the first connection tanks 11 may be embedded in the lower housing P1, and the tube elements of the first connection tubes 13 connected to the second connection tanks 12 may be embedded in the front cooling plate P2. To this end, the lower housing P1 and the front cooling plate P2 may have structures protruding at the positions of the first connection tubes 13, and the first connection tubes 13 may be embedded in the lower housing P1 and the front cooling plate P2 in a distributed manner.

Similarly, each of the second connection tubes 23 provided between the third and fourth connection tanks 21 and 22 may be embedded in the lower housing P1 and the rear cooling plate P3 in a distributed manner. For example, the second connection tubes 23 may include tube elements connected to the third connection tank 21 and tube elements connected to the fourth connection tanks 22, wherein the tube elements of the second connection tubes 23 connected to the third connection tank 21 may be embedded in the lower housing P1, and the tube elements of the second connection tubes 23 connected to the fourth connection tanks 22 may be embedded in the rear cooling plate P3. To this end, the lower housing P1 and the rear cooling plate P3 may have structures protruding at the positions of the second connection tubes 23, and the second connection tubes 23 may be embedded in the lower housing P1 and the rear cooling plate P3 in a distributed manner.

Figure 7:
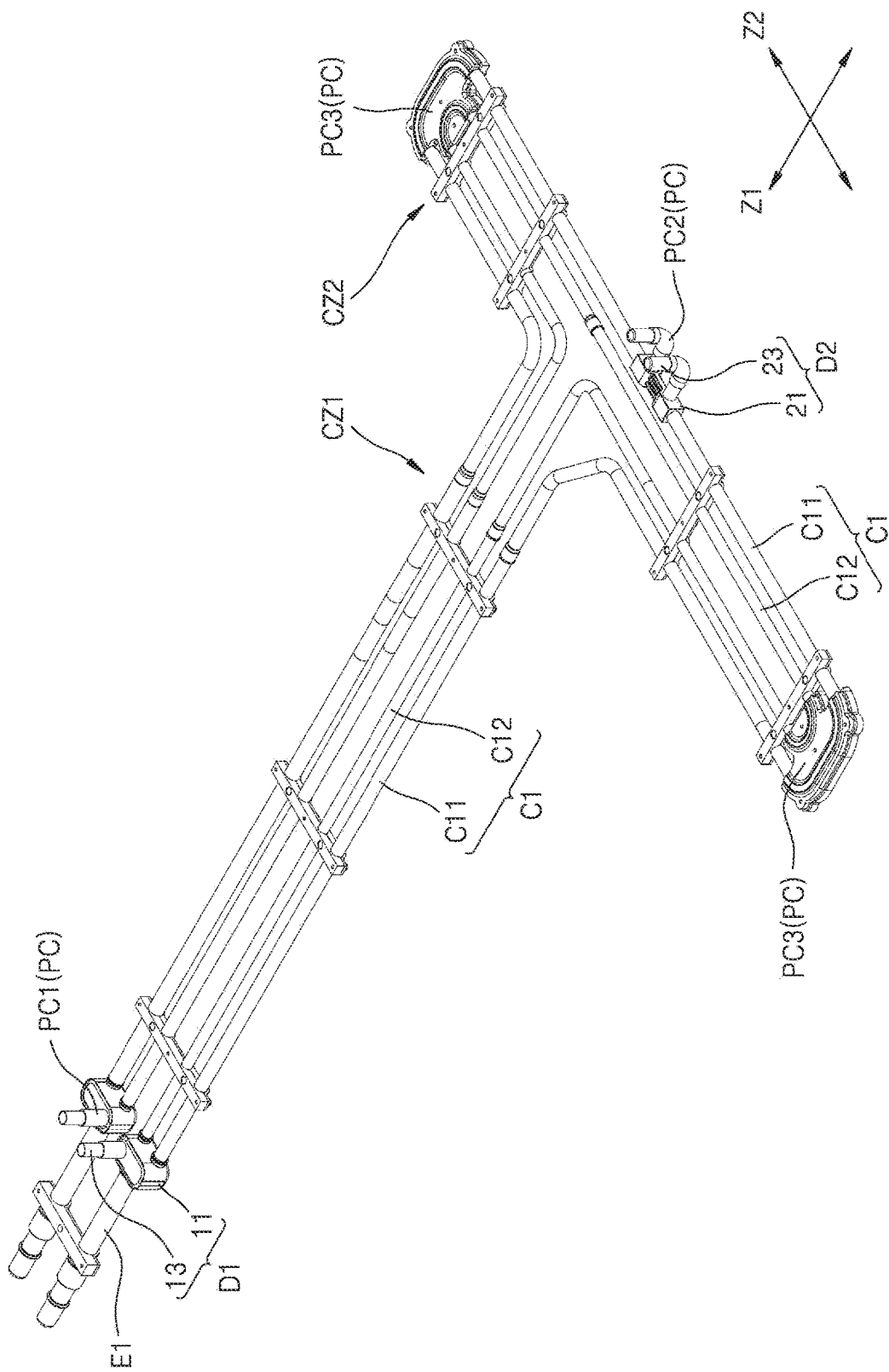
FIG. 7 is a view for explaining tube element covers applicable in an embodiment of the present disclosure, illustrating a first cooling tube embedded in the lower housing and portions of front and rear connectors embedded in the lower housing together with the first cooling tube.

FIG. 7 is a view for explaining tube element covers applicable in an embodiment of the present disclosure, illustrating the first cooling tube C1 embedded in the lower housing P1 and portions of the front connector D1 and the rear connector D2 embedded in the lower housing P1 together with the first cooling tube C1.

Hereinafter, tube element covers applicable in an embodiment of the present disclosure will be described. Referring to FIG. 7, the battery module includes tube elements that accommodate flows of the cooling medium for cooling the battery packs M1, M2, and M3, and tube element covers PC that surround the outer sides of bent portions or discontinuously connected portions of the tube elements. In FIG. 7, tube elements forming the first cooling tube C1, and tube element covers PC surrounding the outer sides of the tube elements are illustrated, and in an embodiment of the present disclosure, the tube element covers PC may be provided on tube elements forming the second cooling tube C2 and/or the third cooling tube C3 in addition to the tube elements forming the first cooling tube C1.

More specifically, in the present disclosure, tube elements are for forming flow paths to accommodate flows of the cooling medium and thus to cool the battery packs M1, M2, and M3. In an embodiment of the present disclosure, the term "tube element" may collectively refer to one or all of the tube elements forming the first to third cooling tubes C1, C2, and C3 for directly cooling the first to third groups of battery packs M1, M2, and M3, and may also refer to one or all of the tube elements forming the front connector D1 and the rear connector D2 connecting the first to third cooling tubes C1, C2, and C3 to each other. That is, in the present disclosure, the tube elements may refer to: the tube elements of the first to third cooling tubes C1, C2 and C3 which are arranged close to the first to third groups of battery packs M1, M2, and M3 for directly cooling the first to third groups of battery packs M1, M2, and M3; the tube elements of the front connector D1 which connect together the first and second cooling tubes C1 and C2 formed at the first and second levels h1 and h2 different from each other; and the tube elements of the rear connector D2 which connect together the first and third cooling tubes C1 and C3 formed at the first and third levels h1 and h3 different from each other. In the present disclosure, the term "tube element" or "tube elements" may be used as a broad concept that encompasses all the tube elements arranged at various positions and having various shapes to form flow paths for accommodating flows of the cooling medium.

As described below, the tube element covers PC may be formed on the outer sides of the tube elements for reinforcing the rigidity of the tube elements, and to this end, the tube element covers PC may be formed at various positions along the paths of the cooling medium to reinforce the rigidity of the tube elements.

Referring to FIG. 7, the tube element covers PC may cover bent portions or discontinuously connected portions of the tube elements. The tube element covers PC may cover fragile portions of the tube elements and may prevent the tube elements from be damaged by a molten metal which is cast at a high pressure during a high-pressure die casting process.

The tube elements forming the first cooling tube C1, the front connector D1, and the rear connector D2 may be embedded in the lower housing P1. The lower housing P1 of this type may be formed through a high-pressure die casting process in which a plurality of tube elements are fixed to the inside of a mold and a high-pressure molten metal is cast into the mold, and the flow of molten metal which is cast at a high pressure may apply relatively high pressure to local portions of the tube elements depending on the shapes of the tube elements. Thus, the tube element covers PC may be provided to surround the fragile portions of the tube elements and thus to prevent the fragile portions of the tube elements from being damaged by the molten metal which is cast at a high pressure. In the present disclosure, tube elements are for accommodating flows of the cooling medium to cool the battery packs M1, M2, and M3, and tube elements damaged during the high-pressure die casting process may obstruct the flows of the cooling medium or increase flow resistance to result in a decrease in the heat-dissipation efficiency of the battery packs M1, M2, and M3 and an increase in power consumption for heat dissipation. In the present disclosure, damage to the tube elements may be prevented by providing the tube element covers PC which surround portions of the tube elements having fragile shapes, thereby improving the heat dissipation performance of the battery packs M1, M2, and M3.

Fragile portions, such as discontinuously connected portions of the tube elements on which the tube element covers PC are provided, may include: a section in which three or more different tube elements are connected to each other to split a flow of the cooling medium or combine flows of the cooling medium; a section in which a flow of the cooling medium is split into two or more flows; or a section in which two or more flows of the cooling medium are joined as one flow.

Figure 8:
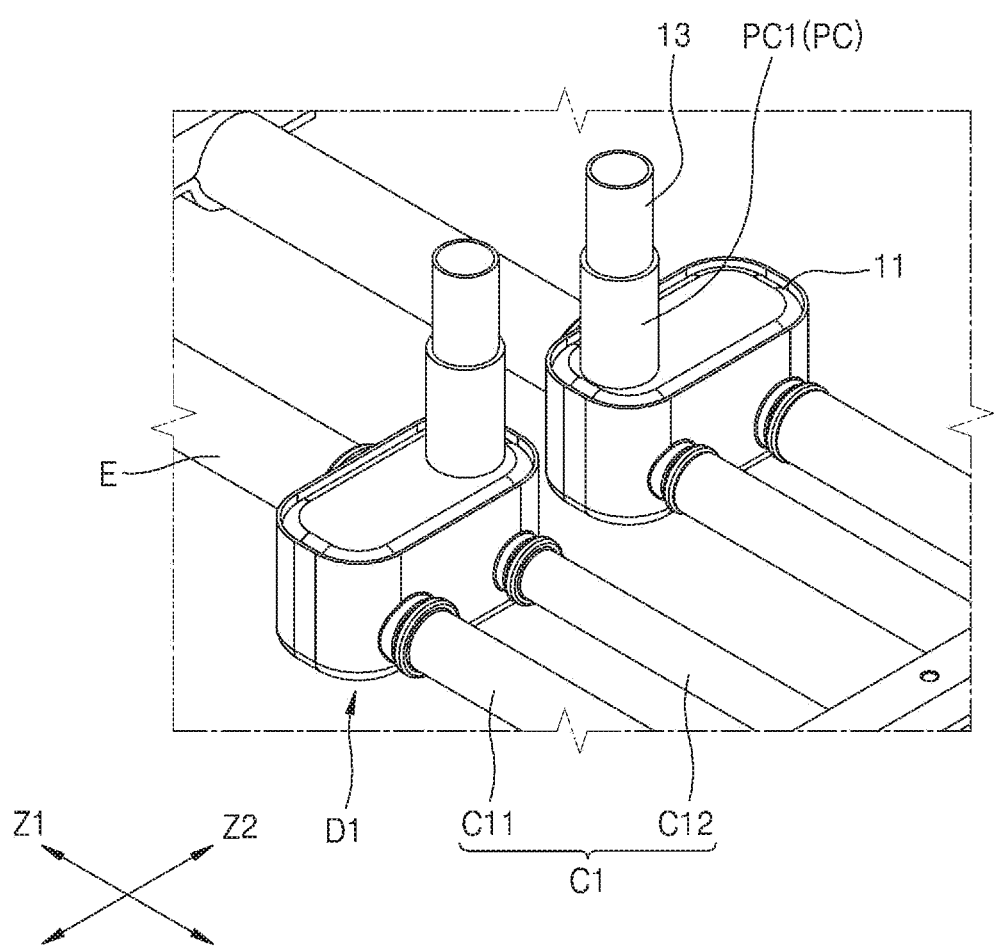
FIG. 8 is an enlarged view illustrating a portion of FIG. 7 for describing first tube element covers applicable to an embodiment of the present disclosure.

FIG. 8 is an enlarged view illustrating a portion of FIG. 7 for describing first tube element covers PC1 applicable to an embodiment of the present disclosure.

Referring to FIGS. 6, 7, and 8 together, the tube element covers PC may include the first tube element covers PC1 provided on the front connector D1 which connects the first and second cooling tubes C1 and C2 located at the first and second levels h1 and h2. The front connector D1 is a portion at which the external connection tubes E are connected to the first and second cooling tubes C1 and C2 and may correspond to a section in which a flow of the cooling medium is split or flows of the cooling medium are joined together.

For example, the front connector D1 may include the first connection tanks 11 formed at the first level h1 and the second connection tanks 12 formed at the second level h2, and the first tube element covers PC1 may be provided to surround the outer sides of the tube elements connected to the first connection tanks 11, for example, to surround the first connection tubes 13.

In an embodiment of the present disclosure, the first tube element covers PC1 are provided on the tube elements connected to the first connection tanks 11 at the first level h1, for example, on the first connection tubes 13. In another embodiment of the present disclosure, however, the first tube element covers PC1 may be provided to surround the outer sides of the tube elements connected to the second connection tanks 12 at the second level h2.

The first connection tanks 11 are for forming branch points or confluence points of the cooling medium, and a plurality of tube elements may be connected to the first connection tanks 11, that is, to inlets and outlets of the first connection tanks 11 so as to transfer different flows of the cooling medium.

Each of the first connection tanks 11 may include two or more inlets or two or more outlets instead of including only a single inlet and a single outlet such that each of the first connection tank 11 may accommodate different flows of the cooling medium. For example, each of the first connection tank 11 may include one inlet and two or more outlets, or two or more inlets and one outlet. In this case, tube elements may be respectively connected to the inlets and outlets of the connection tanks 11 to transfer different flows of the cooling medium.

In this case, the first connection tanks 11 and the tube elements are connected through discontinuous shapes rather than smooth shapes. For example, the first connection tanks 11 forming branch points or confluence points of the cooling medium may have a relatively large width to accommodate different flows of the cooling medium and may be wider than the tube elements connected to the first connection tanks 11, thereby resulting in discontinuous shapes at positions at which the tube elements are connected to the first connection tanks 11.

As described above, a section in which tube elements are discontinuously connected together may greatly resist the flow of a molten metal which is cast at a high pressure and may thus receive relatively high pressure due to reaction force, compared to a section in which a single tube element continuously extends or a section in which two tube elements are simply continuously connected to each other. In this case, the section in which tube elements are discontinuously connected to each other may be covered with a first tube element cover PC1 to reinforce the strength of the tube elements and prevent the tube elements from being damaged by high casting pressure.

The first tube element covers PC1 may surround the outer sides of tube elements (ex. the first connection tubes 13) connected to the first connection tanks 11 which form branch points or confluence points of the cooling medium. More specifically, the first tube element covers PC1 may be provided on the outer sides of the tube elements, for example, the first connection tubes 13, connected to the first connection tanks 11, and may extend in parallel with the first connection tubes 13 in one direction.

The first tube element covers PC1 may extend in one direction from the first connection tanks 11 in parallel with the first connection tubes 13 in contact with the first connection tanks 11. The first connection tanks 11 and the first connection tubes 13 form non-smooth and discontinuous external shapes at positions at which the first connection tanks 11 and the first connection tubes 13 are connected to each other, and the discontinuous shapes between the first connection tanks 11 and the first connection tubes 13 lead to significant resistance to the flow of a high-pressure molten metal and thus receive high pressure due to reaction force Thus, it is preferable to reinforce portions of the first connection tubes 13 connected to the first connection tanks 11, and thus the first tube element covers PC1 may be used to cover the portions of the first connection tubes 13 connected to the first connection tanks 11, that is, the first tube element covers PC1 may extend from the portions of the first connection tubes 13 which are in contact with the first connection tanks 11.

The first tube element covers PC1 may be formed in a straight shape corresponding to the outer shape of the tube elements connected to the first connection tanks 11, that is, the outer shape of the first connection tubes 13. The first tube element covers PC1 may be formed in a pipe shape having a greater diameter than the tube elements (ex. the first connection tubes 13) to be reinforced. The first tube element covers PC1 having a straight shape may be provided as pipe pieces cut to certain lengths to surround the tube elements (ex, the first connection tubes 13) to be reinforced.

Figure 9A:
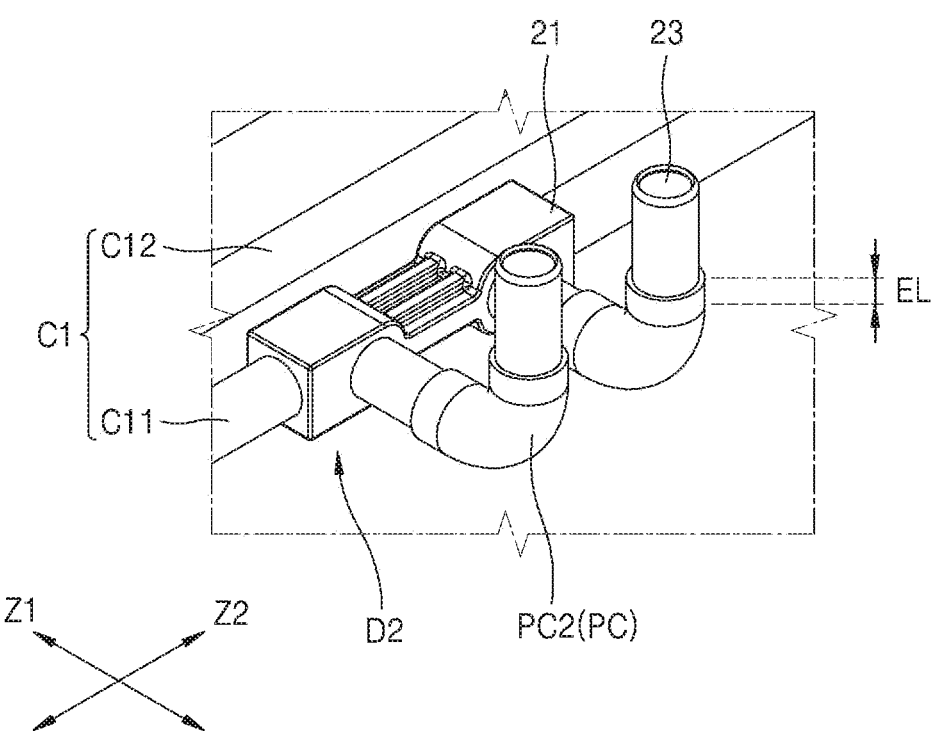
FIGS. 9A and 9B are enlarged views illustrating a portion of FIG. 7 for describing second tube element covers applicable to another embodiment of the present disclosure.
Figure 9B:
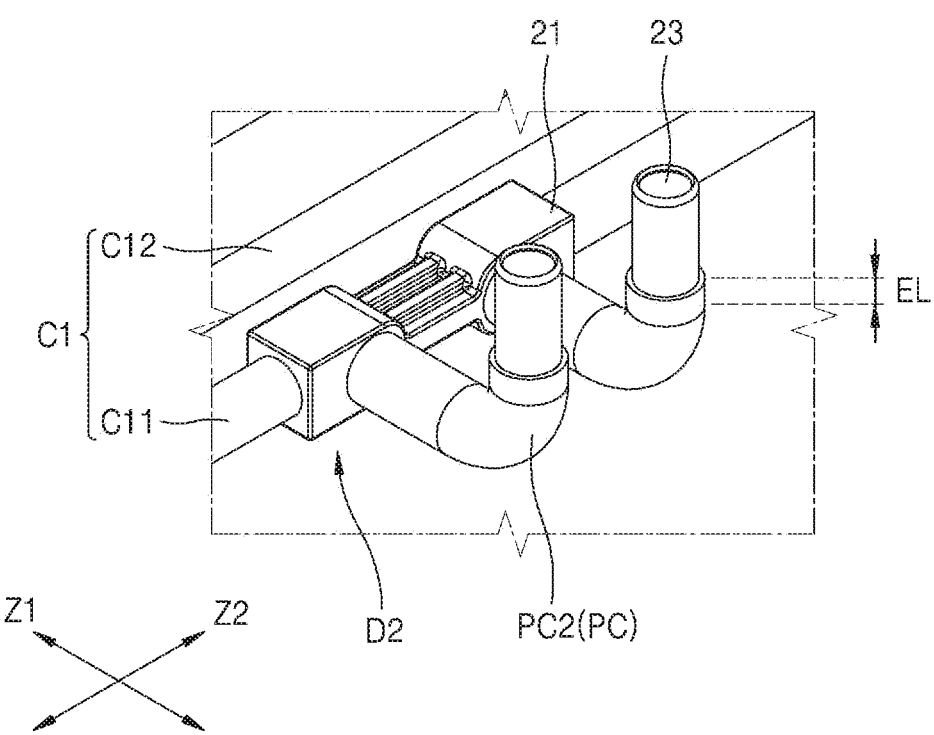

In a mold for forming the lower housing P1, the first tube element covers PC1 may cover the tube elements (ex. the first connection tubes 13) to be reinforced and are exposed to the flow of a high-pressure molten metal which is cast into the mold, and as the molten metal solidifies, the first tube element covers PC1 are embedded in the lower housing P1. In this case, the first tube element covers PC1 and the lower housing P1 may be formed of the same material to prevent defects such as corrosion or cracks that may occur at the interface between different metals. That is, the first tube element covers PC1 may be formed of the same material as the lower housing P1 formed of the molten metal which is cast into the mold, and since the first tube element covers PC1 and the lower housing P1 are formed of the same metallic material even though the first tube element covers PC1 and the lower housing P1 are formed through different processes, the first tube element covers PC1 and the lower housing P1 may be securely coupled to each other at the interface therebetween, FIGS. 9A and 9B are enlarged views illustrating a portion of FIG. 7 for describing second tube element covers applicable to another embodiment of the present disclosure.

Referring to FIGS. 6, 7, 9A, and 9B together, the tube element covers PC may include includes second tube element covers PC2 provided on the rear connector D2 which connects together the first and third cooling tubes C1 and C3 located at the first and third levels h1 and h3. The rear connector D2 is a portion at which the first and third cooling tubes C1 and C3 are connected to each other and may correspond to a section in which a flow of the cooling medium is split or flows of the cooling medium are joined together.

For example, the rear connector D2 may include the third connection tank 21 provided at the first level h1 and the fourth connection tanks 22 provided at the third level h3, and the second tube element covers PC2 may be provided to surround the outer sides of the tube elements connected to the third connection tanks 21 for example, to surround the second connection tubes 23. In an embodiment of the present disclosure, the second tube element covers PC2 are provided on the tube elements connected to the third connection tank 21 at the first level h1, for example, on the second connection tubes 23. In another embodiment of the present disclosure, however, the second tube element covers PC2 may be provided to surround the outer sides of the tube elements connected to the fourth connection tanks 22 at the third level h3.

The third connection tank 21 is for forming a branch point or a confluence point of the cooling medium, and a plurality of tube elements may be connected to the third connection tank 21, that is, to an inlet and an outlet of the third connection tank 21 to transfer different flows of the cooling medium.

In this case, the third connection tank 21 and the tube elements are connected to each other through discontinuous shapes rather than smooth shapes. For example, the third connection tank 21 forming a branch point or a confluence point of the cooling medium may have a relatively large width to accommodate different flows of the cooling medium and may be wider than the tube elements connected to the third connection tank 21, thereby resulting in discontinuous shapes at positions at which the tube elements are connected to the third connection tank 21. In this case, sections in which tube elements are discontinuously connected may be covered with the second tube element covers PC2 to reinforce the strength of the tube elements and prevent the tube elements from being damaged by high casting pressure.

The second tube element covers PC2 may surround the outer sides of tube elements (ex. the second connection tubes 23) connected to the third connection tank 21 which forms a branch point or a confluence point of the cooling medium. More specifically, the second tube element covers PC2 may be provided on the outer sides of the tube elements, for example, the second connection tubes 23, connected to the third connection tank 21, and may extend in parallel with the second connection tubes 23.

The second tube element covers PC2 may be formed in a curved shape corresponding to the external shape of the second connection tubes 23. The second connection tubes 23, which are reinforced by the second tube element covers PC2, may correspond to sections in which tube elements are discontinuously connected and the paths of the tube elements are curved, A molten metal which is cast into a mold at a high pressure may apply higher pressure to the sections in which tube elements are discontinuously connected and the paths of the tube elements are curved, than to a section in which a single tube element extends straight, and thus the second tube element covers PC2 may be provided to reinforce tube elements such as the second connection tubes 23 and thus to prevent the tube elements from being damaged by the flow of the high-pressure molten metal.

In particular, since the wall thickness of a tube element (ex. the second connection tubes 23) is relatively small in a bent section of the tube element because of plastic deformation occurring during a process of bending the tube element (ex. the second connection tubes 23), it is preferable to reinforce the tube element by covering the bent section of the tube element with a second tube element cover PC2.

The second tube element covers PC2 may be formed as curved pipe pieces cut into certain lengths, and tube elements (ex, the second connection tubes 23) to be reinforced may be surrounded with the second tube element covers PC2 and may be bent together with the second tube element covers PC2 such that the second tube element covers PC2 may be coupled to the tube elements (ex. the second connection tubes 23) in a curved shape without any gap therebetween.

In this case, for sufficient tolerance in length and reinforcement of the tube elements (ex. the second connection tubes 23) against high casting pressure, it is preferable that the lengths of the second tube element covers PC2 be adjusted such that each of the second tube element covers PC2 may cover a bent portion and adjacent straight portions of the tube element (ex. the second connection tubes 23) rather than covering only the bent portion of the tube element. This is because, although high casting pressure is locally mainly applied to the bent portion of the tube element, the adjacent straight portions of the tube element may also be exposed to high pressure due to propagation of pressure. For example, preferably, each of the second tube element covers PC2 may have an extension length EL of 5 mm or more along a straight portion of the tube element (ex. the second connection tubes 23) to be reinforced, from an end point of the bent portion of the tube element (ex. the second connection tubes 23) to be reinforced.

Referring to FIG. 9B, the second tube element covers PC2 may be in contact with the third connection tank 21 and extend from the third connection tank 21 in parallel with the second connection tubes 23. The third connection tank 21 and the second connection tubes 23 form non-smooth and discontinuous external shapes at positions at which the third connection tank 21 and the second connection tubes 23 are connected to each other, and the non-smooth and discontinuous shapes between the third connection tank 21 and the second connection tubes 23 lead to significant resistance to the flow of a high-pressure molten metal and thus receives high pressure due to reaction force. Thus, it is preferable to reinforce portions of the second connection tubes 23 connected to the third connection tank 21, and thus the second tube element covers PC2 may extend along the lengths of the second connection tubes 23 while covering the portions of the second connection tubes 23 connected to the third connection tank 21, that is, the second tube element covers PC2 may extend from the portions of the second connection tubes 23 which are in contact with the third connection tank 21.

In a mold for forming the lower housing P1, the second tube element covers PC2 may cover tube elements (ex, the second connection tubes 23) to be reinforced and are exposed to the flow of a high-pressure molten metal which is cast into the mold, and as the molten metal solidifies, the second tube element covers PC2 may be embedded in the lower housing P1. In this case, the second tube element covers PC2 and the lower housing P1 may be formed of the same material to prevent defects such as corrosion or cracks that may occur at the interface between different metals.

When the tube element covers PC are described in the present disclosure, a section or portion referred as a section or portion in which connection between tube elements is discontinuous may not include a section or portion in which the flow of the cooling medium is interrupted. In the battery module of the present disclosure, the cooling medium may be circulated without interruption at a certain section.

When the tube element covers PC are described in the present disclosure, a section or portion referred as a section or portion in which connection between tube elements is discontinuous may not include a section or portion in which two different tube elements are connected to each other. The reason for this is that such a section is not a section in which a flow of the cooling medium is split into two flows or two flows of the cooling medium are joined together. However, a section in which three or more tube elements are connected to each other may correspond to a section in which a flow of the cooling medium is split into two flows or flows of the cooling medium are joined together, and thus the section in which three or more tube elements are connected to each other may correspond to a section in which connection of tube elements is discontinuous.

Each of the tube element covers PC may be formed on a section in which a tube element is bent, in addition to being formed on a section in which connection of tube elements is discontinuous.

A bent section of a tube element may have a relatively small wall thickness as a result of plastic deformation occurring during a bending process of the tube element. In addition, a bent section of a tube element may greatly resist the flow of a molten metal which is cast at a high pressure and may thus receive relatively high pressure due to reaction force, compared to a straight section of the tube element which extends in one direction. In this case, the bent section of the tube element may be covered with a tube element cover PC to reinforce the tube element and prevent the tube element from being damaged by high casting pressure.

Figure 10:
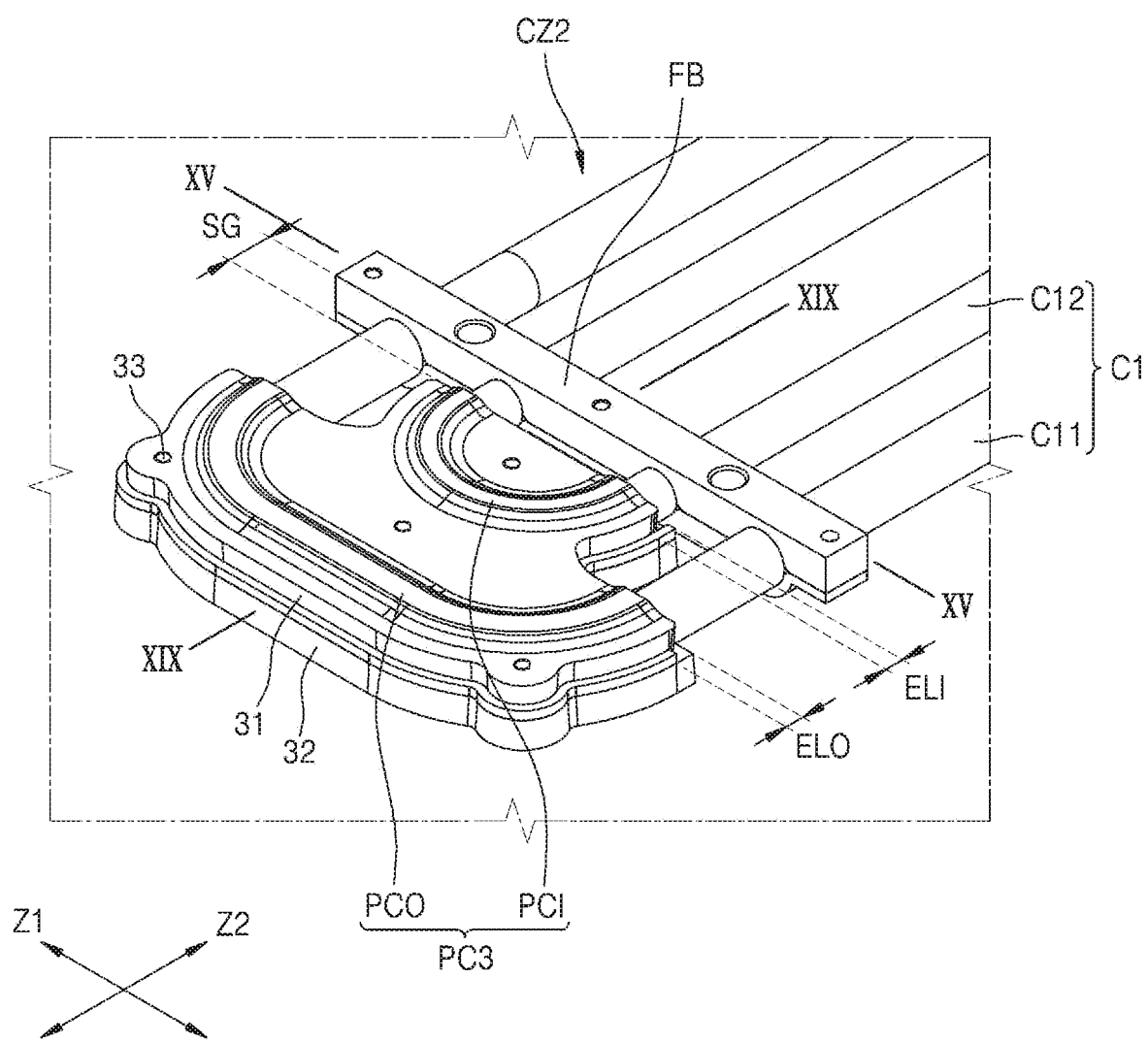
FIG. 10 is an enlarged view illustrating a portion of FIG. 7 for describing a third tube element cover applicable to an embodiment of the present disclosure.

FIG. 10 is an enlarged view illustrating a portion of FIG. 7 for describing a third tube element cover PC3 applicable to an embodiment of the present disclosure.

Referring to FIGS. FIGS. 6, 7, and 10, the tube element covers PC may include third tube element covers PC3 which cover bent sections of the first cooling tube C1. As described above, the lower housing P1 in which the first cooling tube C1 is embedded may include: the longitudinal portion PZ1 extending in the first direction Z1 in parallel with the front cooling plate P2; and the transverse portion PZ2 extending in the second direction Z2 in parallel with the rear cooling plate P3. Similarly, the first cooling tube C1 may include: a longitudinal portion CZ1 (refer to FIG. 7) extending in the first direction Z1 in parallel with the second cooling tube C2; and a transverse portion CZ2 (refer to FIG. 7) extending in the second direction Z2 in parallel with the third cooling tube C3. The first to third cooling tubes C1, C2, and C3 are respectively embedded in the lower housing P1 and the front and rear cooling plates P2 and P3, and the lower housing P1 and the front and rear cooling plates P2 and P3 are formed in parallel with the first to third cooling tubes C1, C2, and C3 and form the external shapes of the first to third cooling tubes C1, C2 and C3, such that the relative arrangement of the longitudinal portion PZ1 and the transverse portion PZ2 of the lower housing P1 and the front and rear cooling plates P1 and P3 may be the same as the relative arrangement of the longitudinal portion CZ1 and the transverse portion CZ2 of the first cooling tube C1 and the second and third cooling tubes C2 and C3.

The third tube element covers PC3 may cover tube elements of the first cooling tube C1 which are bent at both sides of the transverse portion CZ2 to turn back the flow of the cooling medium in the length direction (ex. the second direction Z2) of the transverse portion CZ2. Each of the third tube element covers PC3 may cover a group of tube elements rather than covering only one tube element. For example, each of the third tube element covers PC3 may have a structure for covering two adjacent tube elements of the first cooling tube C1, For example, in an embodiment of the present disclosure, the tube elements forming the first cooling tube C1 may extend in parallel with each other, and based on a direction in which the tube elements are bent, the tube elements may include the inner tube element C12 arranged in a relatively inner region and the outer tube element C11 arranged in a relatively outer region. For example, the outer tube element C11 may form a flow path passing through the rear connector D2, and the inner tube element C12 may form a flow path bypassing the rear connector D2.

Each of the third tube element covers PC3 may cover both the inner tube element C12 and the outer tube element C11, and may include an inner portion PCI covering the inner tube element C12 and an outer portion PCO covering the outer tube element C11. The expression "the third tube element cover PC3 covers a group of tube elements together" may not mean that the third tube element cover PC3 has separate structures which respectively cover the tube elements but may mean that the third tube element cover PC3 having a single integral structure covers two or more tube elements. That is, the inner portion PCI of the third tube element cover PC3 which covers the inner tube element C12 may be formed in one piece with the outer portion PCO of the third tube element cover PC3 which covers the outer tube element C11, and thus the inner portion PCI and the outer portion PCO may not be separate from each other.

Figure 11:
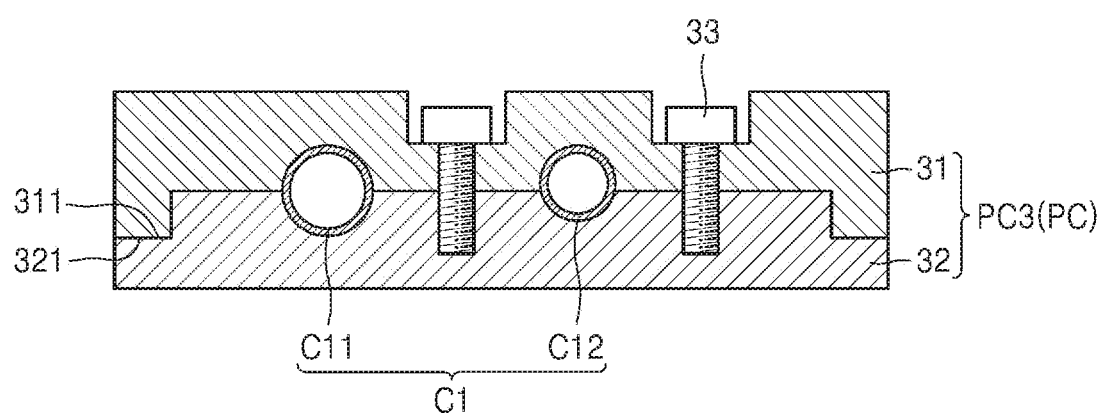
FIG. 11 is a cross-sectional view illustrating a third tube element cover according to an embodiment of the present disclosure.
Figure 12:
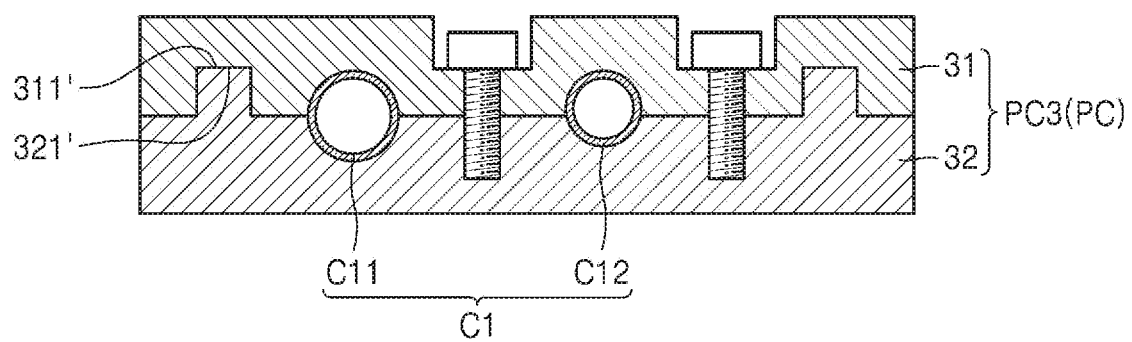
FIGS. 12 and 13 are cross-sectional views illustrating third tube element covers according to other embodiments of the present disclosure.
Figure 13:
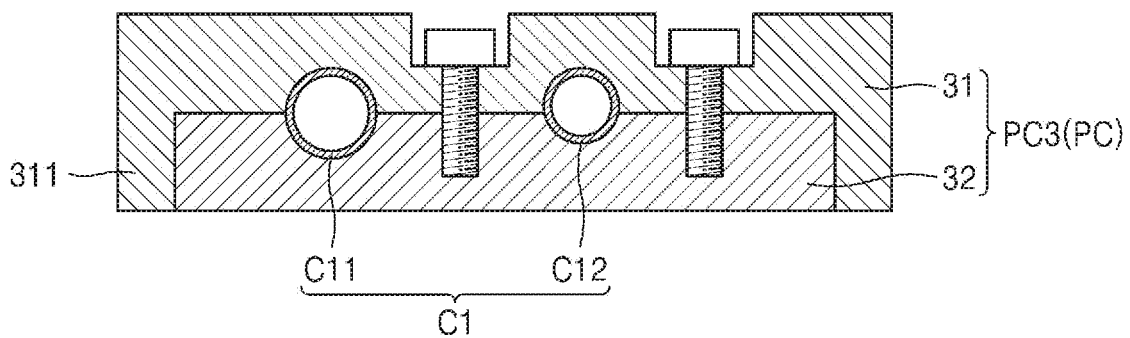
Figure 14:
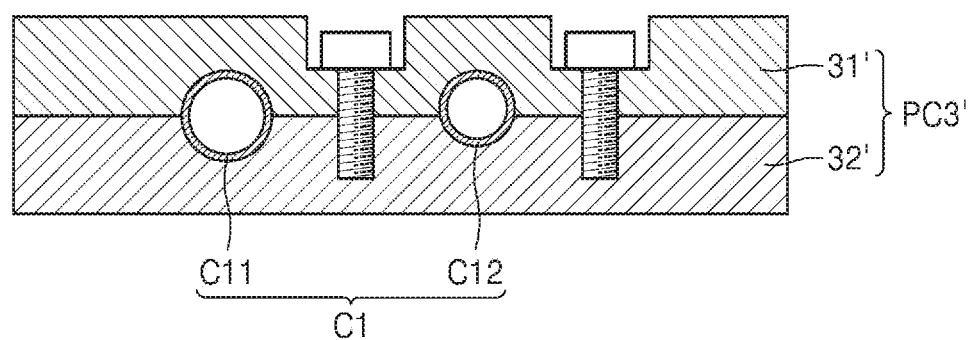
FIG. 14 is a cross-sectional view illustrating a third tube element cover according to a comparative example for comparison with the present disclosure.

FIG. 11 is a cross-sectional view illustrating a third tube element cover PC3 according to an embodiment of the present disclosure. FIGS. 12 and 13 are cross-sectional views illustrating the third tube element covers PC3 according to other embodiments of the present disclosure, and FIG. 14 is a cross-sectional view illustrating a third tube element cover PC3' according to a comparative example for comparison with the present disclosure.

Referring to the drawings, the third tube element cover PC3 may include a first cover member 31 and a second cover member 32 that are coupled to each other in mutually-facing directions in a state in which a group of tube elements to be reinforced, for example, the inner tube element C12 and the outer tube element C11 are between the first cover member 31 and the second cover member 32. In addition, the third tube element cover PC3 may include fastening members 33 for fastening the first and second cover members 31 and 32 to each other. For example, the fastening members 33 may include bolts that are inserted through the first cover member 31 and are coupled to the second cover member 32.

In a mold for forming the lower housing P1, opposite sides of tube elements to be reinforced (ex. the inner tube element C12 and the outer tube element C11) are covered with the first and second cover members 31 and 32 coupled to each other by the fastening members 33, and the first and second cover members 31 and 32 are exposed to the flow of a high-pressure molten metal which is cast into the mold and are embedded in the mold as the molten metal solidifies. In this case, it may be preferable that the first and second cover members 31 and 32 are firmly coupled to each other such that the molten metal may not permeate between the first and second cover members 31 and 32. Therefore, two or more fastening members 33 may be used at two or more positions for fastening the first and second cover members 31 and 32 to each other.

Referring to FIG. 10, the fastening members 33 may be respectively provided in an inner region of the inner tube element C12, an outer region of the outer tube element C11, and an intermediate region between the inner tube element C12 and the outer tube element C11, In this case, at least two fastening members 33 may be provided in the outer region of the outer tube element C11 because the outer region of the outer tube element C11 is relatively wide, and at least one fastening member 33 may be provided in each of the inner region of the inner tube element C12 and the intermediate region between the inner tube element C12 and the outer tube element C11. The positions at which the fastening members 33 are provided may be determined based on the number of tube elements to be reinforced, and when two tube elements, that is, the inner tube element C12 and the outer tube element C11, are reinforced as described, the fastening members 33 may be provided at at least four positions.

Referring to FIG. 11, the first and second cover members 31 and 32 may be fitted to each other such that a molten metal may not permeate between the first and second cover members 31 and 32. The first and second cover members 31 and 32 are fitted to each other such that a stepped interface may be formed between the first and second cover members 31 and 32.

For example, the first cover member 31 may include a protruding portion 311 which protrudes toward the second cover member 32, and the second cover member 32 may include a receiving portion 321 which receives the protruding portion 311 of the first cover member 31. The protruding portion 311 of the first cover member 31 and the receiving portion 321 of the second cover member 32 may be formed at positions corresponding to each other, and as shown in FIG. 11, the protruding portion 311 and the receiving portion 321 may form a stepped interface between the first and second cover members 31 and 32. The stepped interface formed by the protruding portion 311 and the receiving portion 321 may prevent a molten metal cast into a mold from permeating into the first and second cover members 31 and 32 along the interface between the first and second cover members 31 and 32. That is, the protruding portion 311 and the receiving portion 321 may effectively prevent the molten metal from permeating along the interface between the first and second cover members 31 and 32.

However, when a flat interface is formed between first and second cover members 31' and 32' as in the comparative example of the present disclosure shown in FIG. 14, it is difficult to prevent the permeation of a molten metal along the interface between the first and second cover members 31' and 32'.

Although the third tube element cover PC3' including the first and second cover members 31' and 32' is for protecting tube elements by surrounding the outer sides of the tube elements, when a molten metal cast into a mold permeates into the first and second cover members 31' and 32', the tube elements covered with the third tube element cover PC3' are not protected but are exposed to the molten metal. Thus, it is preferable to prevent permeation of a molten metal into the first and second cover members 31' and 32'.

Referring to FIG. 12, a protruding portion 321' and a receiving portion 311' may be respectively formed on the second cover member 32 and the first cover member 31. As long as the protruding portion 321' and the receiving portion 311' are formed at positions corresponding to each other to form a stepped interface between the first and second cover members 31 and 32, the protruding portion 321' and the receiving portion 311' may be selectively formed on the first and second cover members 31 and 32.

As shown in FIG. 13, one of the first and second cover members 31 and 32 may include a protruding portion 311, and the other of the first and second cover members 31 and 32 may not include a receiving portion.

For example, the first cover member 31 may include a protruding portion 311, and the protruding portion 311 of the first cover member 31 may surround the outer periphery of the second cover member 32. In this case, the second cover member 32 may receive the protruding portion 311 of the first cover member 31 by the outer periphery of the second cover member 32, and an additional receiving portion may not be formed on the second cover member 32.

For example, the second cover member 32 may be entirely accommodated between both sides of the protruding portion 311 of the first cover member 31, and the interface between the first and second cover members 31 and 32 may be blocked by the protruding portion 311 such that permeation of a molten metal through the interface between the first and second cover members 31 and 32 may be effectively prevented.

The third tube element cover PC3 may be formed by die casting and may be formed of the same material as the lower housing P1. In a mold for forming the lower housing P1, the third tube element cover PC3 covers a group of tube elements (ex. the inner tube element C12 and the outer tube element C11) to be reinforced and is exposed to the flow of a high-pressure molten metal which is cast into the mold, and as the molten metal solidifies, the third tube element cover PC3 is embedded in the lower housing P1. In this case, the third tube element cover PC3 and the lower housing P1 may be formed of the same material to prevent defects such as corrosion or cracks that may occur at the interface between different metals.

Referring to FIG. 10, the third tube element cover PC3, which is for covering and reinforcing portions of tube elements which are bent in a curved shape, may preferably cover and reinforce the bent portions and adjacent straight portions of the tube elements rather than covering and reinforcing only the bent portions of the tube elements such that the third tube element cover PC3 may have sufficient tolerance along the lengths of the tube elements and sufficiently reinforce the tube elements against high casting pressure. This is because, although high casting pressure is locally mainly applied to the bent portions of the tube elements, the adjacent straight portions of the tube elements may also be exposed to high pressure due to propagation of pressure. For example, preferably, the third tube element cover PC3 may have extension lengths ELI and ELO within the range of 5 mm or more along the straight portions of the tube elements to be reinforced, from end points of the bent portions of the tube elements in the length direction of the transverse portion CZ2 (ex. the second direction Z2). That is, the third tube element cover PC3 may extend along the straight portions of the tube elements from the bent portions of the tube elements and may thus have extension lengths ELI and ELO with the range of 5 mm or more along the straight portions of the tube elements from end points of the bent portions of the tube elements.

The third tube element cover PC3 may cover neighboring tube elements together, specifically, the inner tube element C12 and the outer tube element C11 together. The third tube element cover PC3 may include the inner portion PCI and the outer portion PCO which respectively cover the inner tube element C12 and the outer tube element C11, and the inner portion PCI and outer portion PCO may have extension lengths ELI and ELO within the range of 5 mm or more along straight portions of the inner tube element C12 and the outer tube element C11 from end points of bent portions of the inner tube element C12 and the outer tube element C11. As a result, the inner portion PCI covering the inner tube element C12 may extend more than the outer portion PCO covering the outer tube element C11 of the third tube element cover PC3.

More specifically, the inner portion PCI and the outer portion PCO may respectively have the extension lengths ELI and ELO within the range of 5 mm or more in the length direction of the transverse portion CZ2 (ex. the second direction Z2), from the end points of the bent portions of the inner tube element C12 and the outer tube element C11, and thus, the inner portion PCI may extend more than the outer portion PCO in the length direction of the transverse portion CZ2 (ex. the second direction Z2).

When the inner portion PCI and the outer portion PCO of the third tube element cover PC3 extend to the same length position in the length direction of the transverse portion CZ2 (ex. the second direction Z2), that is, when the outer portion PCO extends to the same position as the inner portion PCI in the length direction of the transverse portion CZ2, the area occupied by the third tube element cover PC3 increases, undesirably obstructing the flow of a molten metal which is cast into a lower housing mold and unnecessarily reducing the flow space of the molten metal.

The third tube element cover PC3 may have a structure that covers together a group of tube elements to be reinforced, for example, the inner tube element C12 and the outer tube element C11. Since the third tube element cover PC3 covers tube elements (ex. the inner tube element C12 and the outer tube element C11) which neighbor each other and extend side by side, the neighboring tube elements (ex. the inner tube element C12 and the outer tube element C11) may support each other and may be efficiently reinforced with a simple structure, compared with the structure in which separate tube element covers PC respectively cover the tube elements.

However, a structure such as the third tube element cover PC3, which covers together a group of adjacent tube elements (ex. the inner tube element C12 and the outer tube element C11), reduces the flow space of a molten metal cast into a mold, and thus, as shown in FIG. 10, it is preferable that the structure be sufficiently spaced apart from a binder FB which is another structure covering the group of adjacent tube elements (ex. the inner tube element C12 and the outer tube element C11). For example, a clearance SG of at least 5 mm may be secured between the binder FB and the third tube element cover PC3. More specifically, it is preferable that a clearance SG of at 5 mm or more is secured between the binder FB and the third tube element cover PC3 in the length direction of the transverse portion CZ2 (ex. the second direction Z2).

Figure 15:
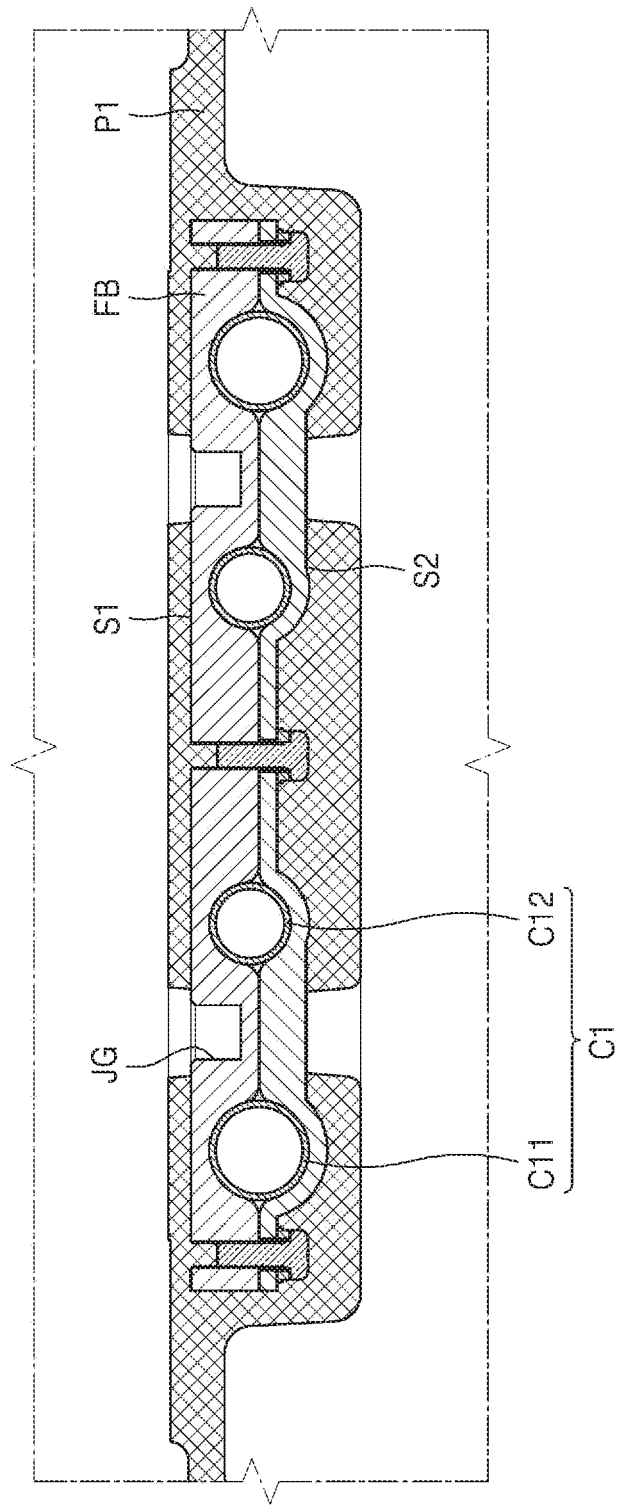
FIG. 15 is a cross-sectional view taken along line XV-XV of FIG. 10 for illustrating a binder embedded in the lower housing.

FIG. 15 is a cross-sectional view taken along line XV-XV of FIG. 10 for illustrating the binder FB embedded in the lower housing P1.

The binder FB binds and fixes tube elements (ex. the inner tube element C12 and the outer tube element C11) which neighbor each other and extend side by side such that when a high-pressure die casting process is performed to form the lower housing P1, the positions of the tube elements (ex. the inner tube element C12 and the outer tube element C11) may be fixed inside a mold into which a high-pressure molten metal is cast. Jig grooves JG may be formed in the binder FB to receive a jig (not shown) inserted into the mold from mold equipment. For example, the binder FB may have first and second surfaces S1 and S2 which are opposite each other, and the jig grooves JG may be formed by recessing any one of the first and second surfaces S1 and S2, for example, the first surface S1. Thus, the binder FB may be firmly fixed to the inside of the mold by a jig (not shown) fitted into the jig grooves JG of the binder FB, and the positions of tube elements (ex. the inner tube element C12 and the outer tube element C11) inserted in the binder FB may also be fixed.

The tube element cover PC of the present disclosure surround the outer sides of tube elements to be reinforced and are embedded in a mold together with the tube elements. That is, the binder FB and the tube element cover PC that are provided on the outer sides of the tube elements may all be embedded in the lower housing P1. In this case, the jig grooves JG are formed in the binder FB, whereas no jig groove is formed in the tube element cover PC. That is, the binder FB has a function of fixing the positions of the tube elements to the inside of the mold in combination with the jig of the mold equipment, and the tube element cover PC has a function of reinforcing the tube elements in the mold. Unlike the binder FB, the tube element cover PC is provided inside the mold in a state in which the tube element cover PC is fitted around the tube elements to be reinforced and is floated together with the tube elements. That is, the tube element cover PC fitted around the tube elements to be reinforced is fixed indirectly by the binder FB which is fastened to the tube elements at a position at which the tube element cover PC is not located in the extension direction of the tube elements, and unlike the binder FB, the tube element cover PC is not directly fixed by the jig of the mold equipment.

As shown in FIG. 6, binders FB may be provided on straight portions of tube elements extending in one direction. For example, binders FB may be provided on a straight portion of the first cooling tube C1, a straight portion of the second cooling tube C2, and a straight portion of the third cooling tube C3. In a process of forming the lower housing P1, the front cooling plate P2, or the rear cooling plate P3 in which the first, second, or third cooling tubes C1, C2, or C3 is embedded, a group of tube elements forming the first, second or third cooling tube C1, C2, or C3 may be fixed to the inside of a mold by binders FB. For example, the binders FB may be fitted around the first to third cooling tubes C1, C2, and C3 extending side by side in one direction to fix the positions of the groups of tube elements. In this case, each of the binders FB may be provided on straight portions of tube elements extending in one direction to efficiently fix the positions of the tube elements. As described above, the tube element covers PC, for example, the third tube element covers PC3, may be provided on bent sections of the tube elements to reinforce the tube elements.

Referring to FIG. 10, like the binder FB, the third tube element cover PC3 covers adjacent tube elements, that is, the inner tube element C12 and the outer tube element C11, and thus the third tube element cover PC3 may prevent a molten metal cast into a mold from permeating between the inner tube element C12 and the outer tube element C11. Therefore, for the fluidity of the molten metal cast into the mold, it is preferable that the third tube element cover PC3 and the binder FB covering adjacent tube elements be spaced apart from each other, for example, by a clearance SG of at least 5 mm. For example, when the binder FB is provided in straight portions of the tube elements which extend in one direction (ex. the second direction Z2), the clearance SG between the binder FB and the third tube element cover PC3 may be at least 5 mm in the direction.

Figure 16:
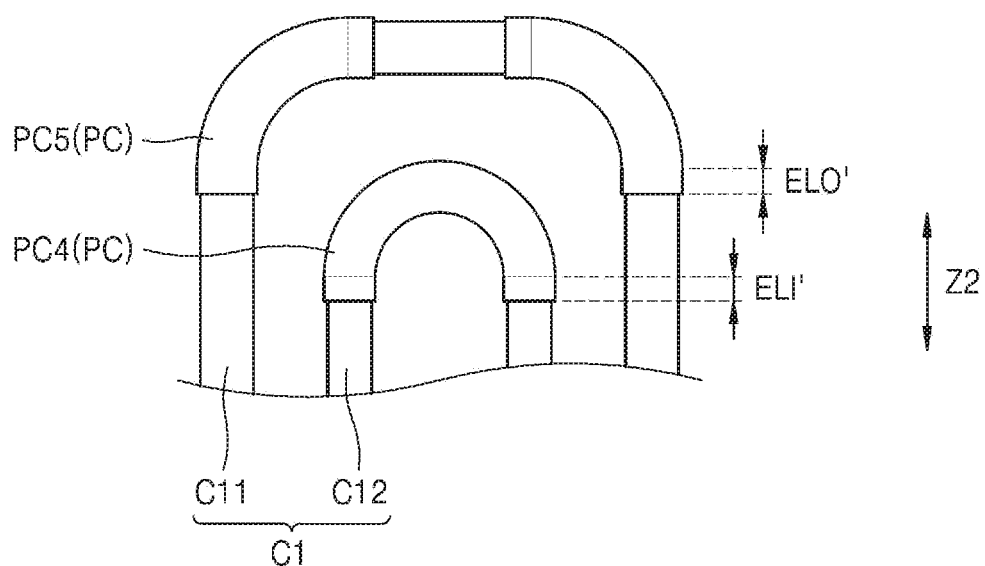
FIG. 16 illustrates fourth and fifth tube element covers applicable to an embodiment of the present disclosure.
Figure 17:
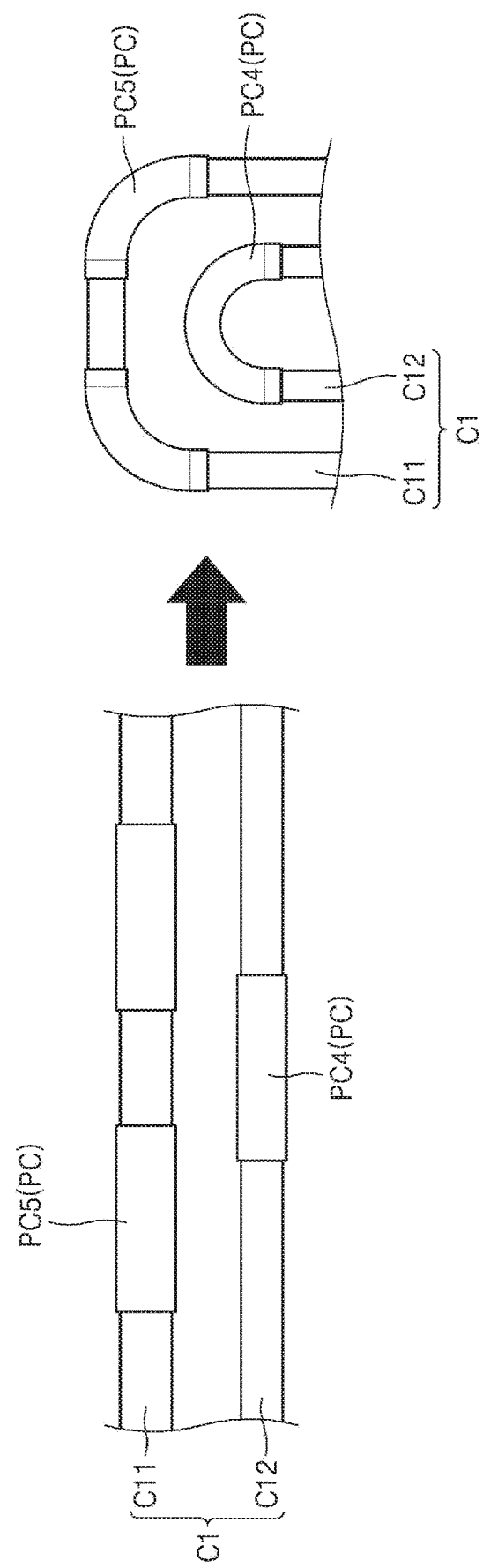
FIG. 17 is a view illustrating how the fourth and fifth tube element covers shown in FIG. 16 are formed.

FIG. 16 illustrates fourth and fifth tube element covers PC4 and PC5 applicable to an embodiment of the present disclosure. FIG. 17 is a view illustrating how the fourth and fifth tube element covers shown in FIG. 16 are formed.

Referring to the drawings, the fourth and fifth tube element covers PC4 and PC5 may be provided on bent portions of tube elements. That is, the fourth and fifth tube element covers PC4 and PC5 may protect the tube elements from a high-pressure molten metal cast into a mold by covering the outer sides of the bent portions of the tube elements.

Referring to the drawings, the fourth and fifth tube element covers PC4 and PC5 may cover the bent portions of the tube elements and may have shapes corresponding to the bent shapes of the tube elements. More specifically, the fourth tube element cover PC4 may be formed in a U-like round shape such that the inlet and outlet of the fourth tube element cover PC4 are opposite each other, and the fifth tube element covers PC5 may be formed in an L-like round shape such that the inlet and outlet of each of the fifth tube element covers PC5 may be perpendicular to each other.

The fourth and fifth tube element covers PC4 and PC5 are different from connection tubes for connecting straight tube elements to each other and changing the flow of the cooling medium, in that the fourth and fifth tube element covers PC4 and PC5 cover the outer sides of the tube elements (ex. the inner tube element C12 and the outer tube element C11) to be reinforced. That is, the tube elements (ex. the inner tube element C12 and the outer tube element C11) to be reinforced are inside the fourth and fifth tube element covers PC4 and PC5 along the lengths of the fourth and fifth tube element covers PC4 and PC5, whereas tube elements to be reinforced are not inside connection tubes which are for changing the flow of the cooling medium.

The fourth and fifth tube element covers PC4 and PC5 may be formed as curved pipe pieces cut into certain lengths by placing the fourth and fifth tube element covers PC4 and PC5 around the tube elements (ex. the inner tube element C12 and the outer tube element C11) to be reinforced, and bending the fourth and fifth tube element covers PC4 and PC5 together with the tube elements (ex. the inner tube element C12 and the outer tube element C11) such that the fourth and fifth tube element covers PC4 and PC5 may be coupled to the tube elements (ex. the inner tube element C12 and the outer tube element C11) without any gap therebetween.

For example, the fourth tube element cover PC4 may be in contact with the tube element (ex. the inner tube element C12) to be reinforced by placing the fourth tube element cover PC4 around the tube element (ex. the inner tube element C12), and bending the fourth tube element cover PC4 together with the tube element (ex. the inner tube element C12) such that the inlet and outlet of the tube element (ex. the inner tube element C12) may be opposite each other.

For example, the fifth tube element covers PC5 may be provided as a pair on two bent portions of the tube element (ex, the outer tube element C11) to be reinforced by covering the tube element (ex. the outer tube element C11) with the fifth tube element covers PC5 to surround two portions of the tube element with the fifth tube element covers PC5, and bending the fifth tube element covers PC5 at two positions together with the tube element. Thus, the fifth tube element covers PC5 may be provided as a pair spaced apart from each other along the tube element (ex. the outer tube element C11) to be reinforced.

For example, the fourth tube element cover PC4 and the fifth tube element covers PC5 may be provided on the inner tube element C12 and the outer tube element C11 that are adjacent to each other. In the bending directions of the tube elements, the fourth tube element cover PC4 may cover the inner tube element C12 which is relatively in an inner region, and the fifth tube element covers PC5 may cover the outer tube element C11 which is relatively in an outer region.

The fourth and fifth tube element covers PC4 and PC5, which are for covering and reinforcing portions of tube elements which are bent in a curved shape, may preferably cover and reinforce the bent portions of the tube elements (ex. the inner tube element C12 and the outer tube element C11) to be reinforced and adjacent straight portions of the tube elements which extend from end points of the bent portions, rather than covering and reinforcing only the bent portions of the tube elements, such that the fourth and fifth tube element covers PC4 and PC5 may have a predetermined tolerance along the lengths of the tube elements and sufficiently reinforce the tube elements against high casting pressure. This is because, although high casting pressure is locally mainly applied to the bent portions of the tube elements (ex. the inner tube element C12 and the outer tube element C11), the adjacent straight portions of the tube elements may also be exposed to high pressure due to propagation of pressure. For example, the fourth and fifth tube element covers PC4 and PC5 may preferably have extension lengths ELI' AND ELO' within the range of 5 mm or more from the end points of the bent portions of the tube elements (ex. the inner tube element C12 and the outer tube element C11) in the length direction of the transverse portion CZ2 (ex. the second direction Z2).

In a mold for forming the lower housing P1, the fourth and fifth tube element covers PC4 and PC5 cover the tube elements (ex. the inner tube element C12 and the outer tube element C11) to be reinforced and are exposed to the flow of a high-pressure molten metal cast into the mold, and as the molten metal solidifies, the fourth and fifth tube element covers PC4 and PC5 are embedded in the lower housing P1. In this case, the fourth and fifth tube element covers PC4 and PC5 and the lower housing P1 may be formed of the same material to prevent defects such as corrosion or cracks that may occur at the interface between different metals.

Figure 18:
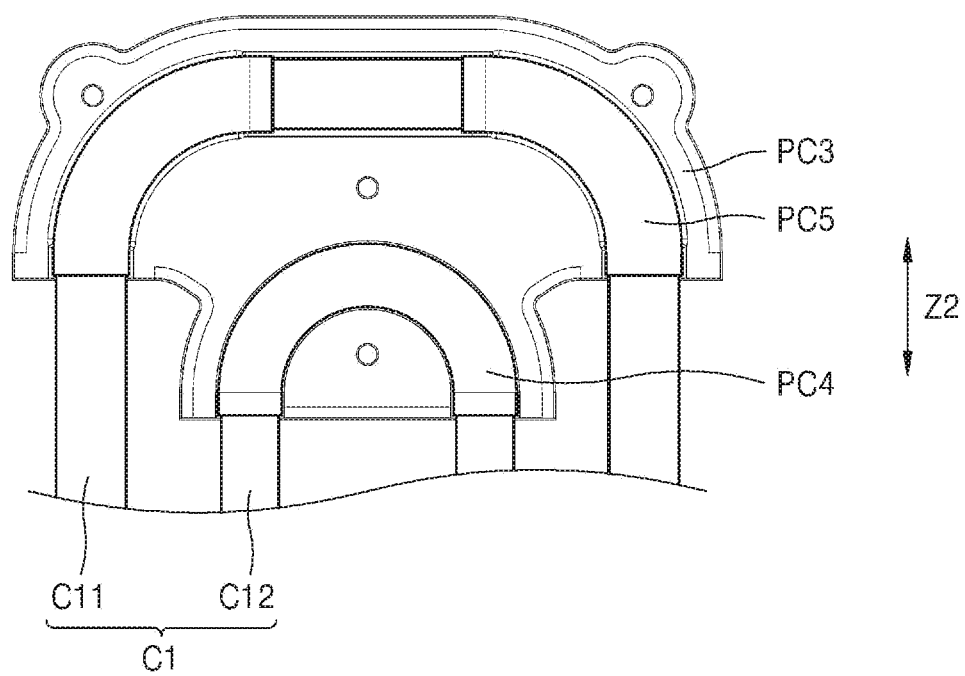
FIG. 18 illustrates third to fifth tube element covers applicable to an embodiment of the present disclosure.

FIG. 18 illustrates the third to fifth tube element covers PC3, PC4, and PC5 applicable to an embodiment of the present disclosure.

Referring to the drawing, in an embodiment of the present disclosure, the fourth and fifth tube element covers PC4 and PC5 may overlap the third tube element cover PC3. That is, the fourth tube element cover PC4 and the fifth tube element covers PC5 may be fitted around the inner tube element C12 and the outer tube element C11, and the inner tube element C12 and the outer tube element C11 around which the fourth and fifth tube element covers PC4 and PC5 are fitted may be covered with the third tube element cover PC3.

That is, the third tube element cover PC3 may cover all the fourth and fifth tube element covers PC4 and PC5 fitted around the inner tube element C12 and the outer tube element C11 in addition to covering the inner tube element C12 and the outer tube element C11. Therefore, the inner tube element C12 and the outer tube element C11 to be reinforced may be protected in an overlapping manner by the third to fifth tube element covers PC3, PC4, and PC5, and damage to the inner tube element C12 and the outer tube element C11 caused by a molten metal cast into a mold at a high pressure tube may be effectively prevented. For example, the third tube element cover PC3 extends longer than the fourth and fifth tube element covers PC4 and PC5 to sufficiently cover the fourth and fifth tube element covers PC4 and PC5.

Figure 19:
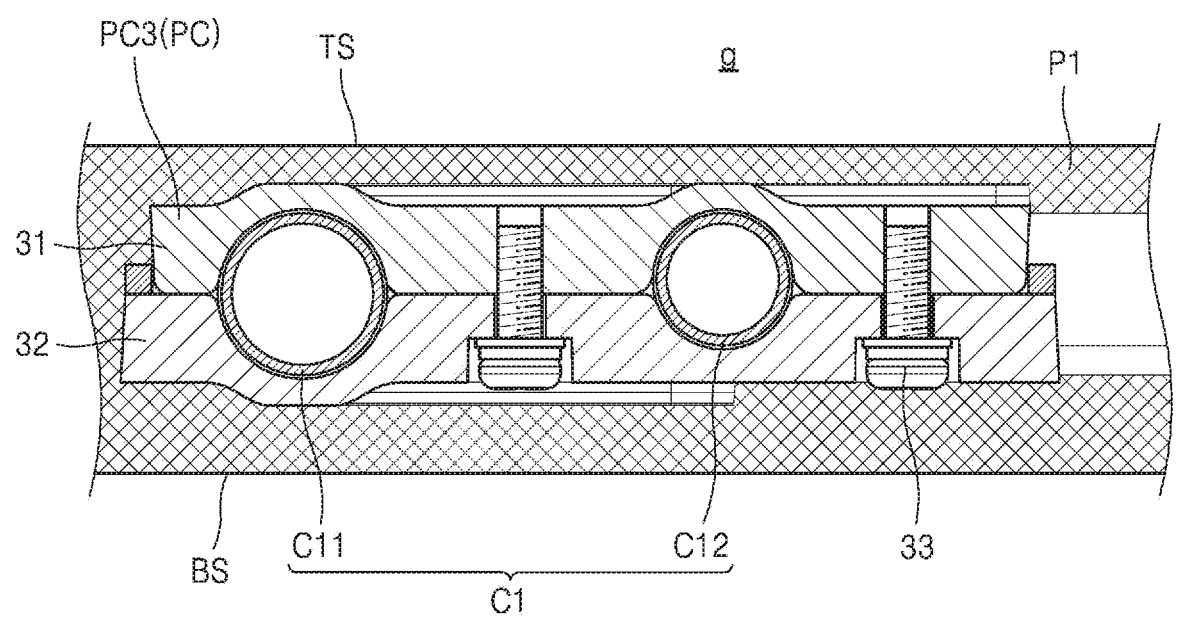
FIG. 19 is a cross-sectional view taken along line XIX-XIX of FIG. 10 to illustrate a tube element cover embedded in the lower housing P1.

FIG. 19 is a cross-sectional view taken along line XIX-XIX of FIG. 10 to illustrate a tube element cover PC embedded in the lower housing P1.

Referring to the drawing, the tube element cover PC (ex. a third tube element cover PC3) of the present disclosure may be embedded in the lower housing P1 together with a plurality of tube elements (ex. the inner tube element C12 and the outer tube element C11) which are for dissipating heat from the battery packs. The expression "the tube element cover PC is embedded in the lower housing P1" may mean that the tube element cover PC is not exposed at a top surface TS or a bottom surface BS of the lower housing P1. For example, the top surface TS of the lower housing P1 may define the accommodation space (g) for the battery packs M1 and provide a support surface for the battery packs M1, and the bottom surface BS of the lower housing P1 may provide a support surface for the battery module. That is, the top surface TS of the lower housing P1 may form a support surface which directly supports battery packs M, and the bottom surface BS of the lower housing P1 may form a support surface which supports the battery module.

The tube element cover PC is placed inside a mold together with the tube elements to be reinforced and is exposed to a high-pressure molten metal which is cast into the mold, and as the molten metal solidifies, the tube element cover PC is embedded in the lower housing P1. The binder FB for fixing the positions of the tube elements in the mold may also be embedded in the lower housing P1 together with the tube element cover PC.

The tube element cover PC and the binder FB may be formed of the same metallic material as the molten metal which is cast into the mold to form the lower housing P1, thereby fundamentally preventing detects that may occur along the interface between the tube element cover PC and the binder FB when the tube element cover PC and the binder FB are formed of different metals. In addition, the lower housing P1 may be coupled to the upper housing U (refer to FIG. 1) in mutually-facing directions in a state in which the accommodation space (g) accommodating the battery packs M1, M2, and M3 is between the lower housing P1 and the upper housing U.

While embodiments of the present disclosure have been described with reference to the accompanying drawings, the embodiments are for illustrative purposes only, and it will be understood by those of ordinary skill in the art that various modifications and equivalent other embodiments may be made therefrom.

INDUSTRIAL APPLICABILITY

The present disclosure may be applied to battery modules which are rechargeable energy sources, and to various devices using battery modules as power sources.

The invention claimed is:

1. A battery module comprising:
    a battery pack;
    a tube element accommodating a flow of a cooling medium for cooling the battery pack, the tube element comprising an inner tube element that is bent and an outer tube element that is bent around the inner tube element; and
    a tube element cover surrounding the tube element in a section in which a path of the tube element is bent or the tube element is discontinuously connected, the tube element cover comprising a third tube element cover that comprises an inner portion and an outer portion which respectively cover the inner tube element and the outer tube element, and the inner portion extends more than the outer portion along an extension direction of the tube element,
    wherein the tube element and tube element cover are embedded in a lower housing, and
    wherein the lower housing is coupled to an upper housing in mutually-facing directions in a state in which an accommodation space in which the battery pack is accommodated is defined between the lower housing and the upper housing.

2. The battery module of claim 1, wherein the section in which the tube element is discontinuously connected comprises a section in which a flow of the cooling medium is split or flows of the cooling medium is joined together.

3. The battery module of claim 2, wherein the tube element cover is formed on an outer side of the tube element connected to a connection tank for forming a branch point or confluence point of the cooling medium.

4. The battery module of claim 1, wherein the battery module comprises:
    a first cooling tube formed at a first level on a bottom of the battery module to cool a first group of battery packs;
    a second cooling tube formed at a second level higher than the first level to cool a second group of battery packs;
    a third cooling tube formed at a third level higher than the first level to cool a third group of battery packs;
    a front connector connecting the first and second cooling tubes to each other; and
    a rear connector connecting the first and third cooling tubes to each other,
    wherein the tube element cover is formed on at least one of tube elements which form the first to third cooling tubes, the front connector, and the rear connector.

5. The battery module of claim 4, wherein the tube element cover comprises:
    a first tube element cover formed on the front connector; and
    a second tube element cover formed on the rear connector.

6. The battery module of claim 5, wherein the first tube element cover is formed on an outer side of a tube element connected to one of first and second connection tanks of the front connector which are formed at the first and second levels.

7. The battery module of claim 6, wherein the first tube element cover extends in one direction in parallel with a tube element from a connection position of the tube element at which the tube element is connected to the first connection tank.

8. The battery module of claim 5, wherein the second tube element cover is formed on an outer side of a tube element connected to one of third and fourth connection tanks of the rear connector which are formed at the first and third levels.

9. The battery module of claim 8, wherein the second tube element cover extends in a bent direction in parallel with a tube element connected to the third connection tank.

10. The battery module of claim 9, wherein the second tube element cover has an extension length of 5 mm or more along a straight portion of the tube element, the straight portion extending in one direction from an end point at which a bent portion of the tube element ends.

11. The battery module of claim 4, wherein the first cooling tube comprises a longitudinal portion extending in parallel with the second cooling tube and a transverse portion extending in parallel with the third cooling tube, and the tube element cover comprises third tube element covers formed on both sides of the transverse portion, the third tube element covers comprising the third tube element cover.

12. The battery module of claim 11, wherein the third tube element covers are formed to cover a tube element of the first cooling tube which is bent to turn back the flow of the cooling medium in a length direction of the transverse portion.

13. The battery module of claim 12, wherein the third tube element covers are used to cover the inner tube element arranged in a relatively inner region in a bent direction of the first cooling tube and the outer tube element arranged in a relatively outer region in the bent direction of the first cooling tube.

14. The battery module of claim 13, wherein each of the inner portion and the outer portion has an extension length of 5 mm or more in the length direction of the transverse portion from an end point at which a bent portion of the inner tube element or the outer tube element ends.

15. The battery module of claim 13, wherein the inner portion extends more than the outer portion in the length direction of the longitudinal portion.

16. The battery module of claim 13, wherein the tube element cover comprises:

a fourth tube element cover fitted around a bent portion of the inner tube element; and a pair of fifth tube element covers fitted around different bent portions of the outer tube element and spaced apart from each other, wherein the third tube element covers are used to cover all the fourth and fifth tube element covers.

17. The battery module of claim 11, wherein each of the third tube element covers comprises first and second cover members which are coupled to each other in mutually-facing directions with a tube element of the first cooling tube being therebetween.

18. The battery module of claim 17, wherein the first and second cover members are fitted to each other to form a stepped interface between the first and second cover members.

19. The battery module of claim 1, further comprising a binder provided in a straight section in which the path of the tube element extends in a direction and comprising a jig groove so as to be coupled to outer sides of the tube element and another tube element extending in parallel with the tube element and fix positions of the tube elements, wherein the binder and the tube element cover are arranged at a distance from each other.

20. The battery module of claim 19, wherein the binder and the tube element cover has a clearance in the direction within a range of 5 mm or more.

21. The battery module of claim 1, wherein the tube element cover is not exposed at a top surface and a bottom surface of the lower housing.

22. The battery module of claim 21, wherein the top surface of the lower housing defines the accommodation space in which the battery pack is accommodated, and provides a support surface for the battery pack, and the bottom surface of the lower housing provides a support surface of the battery module.

23. The battery module of claim 1, wherein the tube element cover and the lower housing are formed of a same metallic material.

\* \* \* \* \*